United States Patent
Bauer et al.

(10) Patent No.: US 10,767,685 B2
(45) Date of Patent: Sep. 8, 2020

(54) HANGABLE APPARATUS AND SYSTEMS AND METHODS THEREFOR

(71) Applicant: Medline Industries, Inc, Northfield, IL (US)

(72) Inventors: Lisa Bauer, Buffalo Grove, IL (US); Brad Mills, Highland Park, IL (US); David Noskowicz, Spring Grove, IL (US)

(73) Assignee: Medline Industries, Inc., Northfield, IL (US)

( * ) Notice: Subject to any disclaimer, the term of this patent is extended or adjusted under 35 U.S.C. 154(b) by 231 days.

(21) Appl. No.: 15/651,774

(22) Filed: Jul. 17, 2017

(65) Prior Publication Data

US 2017/0314607 A1    Nov. 2, 2017

Related U.S. Application Data

(63) Continuation-in-part of application No. 14/549,393, filed on Nov. 20, 2014, now Pat. No. 9,861,222.
(Continued)

(51) Int. Cl.
*F16B 45/00* (2006.01)
*F16M 13/02* (2006.01)
(Continued)

(52) U.S. Cl.
CPC ............ *F16B 45/00* (2013.01); *A47H 1/142* (2013.01); *A47H 1/18* (2013.01); *A47H 13/04* (2013.01);
(Continued)

(58) Field of Classification Search
CPC ................................ A47H 13/04; A47H 1/142
See application file for complete search history.

(56) References Cited

U.S. PATENT DOCUMENTS 905,142 A * 12/1908 Bond
2,093,269 A    9/1937 Hugo
(Continued)

FOREIGN PATENT DOCUMENTS

CA      2485364      11/2003
CN      100384356    11/2013
(Continued)

OTHER PUBLICATIONS

2-Ply Tissue Drape Sheets by Medline; Medline Catalog; http://www.medline.com/catalog/catalog/jsp; Unknown publication date but believe to be prior to present application filing date.
(Continued)

*Primary Examiner* — Alvin C Chin-Shue
(74) *Attorney, Agent, or Firm* — Philip H. Burns, IV

(57) ABSTRACT

A hanger (100) for a hanging item (1400) is provided. The hanger can define an aperture (102). The aperture can include a split rotated concave cardioid upper contour (104). The split rotated concave cardioid upper contour can include a first portion (105) and a second portion (106). The first portion and the second portion can be separated by an inverted convex cardioid (109). The inverted convex cardioid can be suspended into the aperture by two concave sidewalls (112,113). The aperture can include an intersecting concave lower contour (114) comprising a cusp (117).

19 Claims, 24 Drawing Sheets

Related U.S. Application Data

(60) Provisional application No. 61/907,306, filed on Nov. 21, 2013.

(51) Int. Cl.

| | | |
|---|---|---|
| *A47H 1/18* | (2006.01) | |
| *A47H 1/142* | (2006.01) | |
| *A47H 13/04* | (2006.01) | |
| *A47H 13/14* | (2006.01) | |
| *A47G 7/00* | (2006.01) | |
| *A47G 1/20* | (2006.01) | |

(52) U.S. Cl.
CPC .......... *A47H 13/14* (2013.01); *F16M 13/022* (2013.01); *A47G 1/20* (2013.01); *A47G 7/00* (2013.01)

(56) References Cited

U.S. PATENT DOCUMENTS

| | | | |
|---|---|---|---|
| 2,188,163 A | 1/1940 | Sherman | |
| 2,386,603 A | 10/1945 | Glaser | |
| 2,831,538 A | 4/1958 | Lishman | |
| 3,032,242 A | 5/1962 | Roberts | |
| 3,321,003 A | 5/1967 | Boerner | |
| 4,153,097 A * | 5/1979 | Pettibone | A47G 21/167 |
| | | | 160/330 |
| 5,186,232 A | 2/1993 | Zahner | |
| 6,311,756 B1 * | 11/2001 | Anderson | E06B 9/36 |
| | | | 160/178.1 V |
| 6,494,248 B1 | 12/2002 | Zahner | |
| 6,866,082 B1 | 3/2005 | Zahner | |
| 6,886,082 B1 | 3/2005 | Zahner | |
| 6,935,402 B2 * | 8/2005 | Zahner | A47H 7/02 |
| | | | 160/330 |
| 7,028,960 B2 | 4/2006 | Goldstein | |
| 7,137,171 B2 | 11/2006 | Meech et al. | |
| 7,296,609 B2 | 11/2007 | Zahner | |
| 7,370,839 B2 | 5/2008 | Putman | |
| 8,235,088 B2 | 8/2012 | Zahner | |
| D668,091 S | 10/2012 | Zahner | |
| D669,721 S | 10/2012 | Zahner | |
| 8,408,275 B2 | 4/2013 | DeWees et al. | |
| 2005/0022950 A1 | 2/2005 | Putman | |
| 2007/0246174 A1 | 10/2007 | Barrese | |
| 2007/0277944 A1 * | 12/2007 | Wu | A47H 1/06 |
| | | | 160/330 |
| 2008/0178423 A1 | 7/2008 | Patel | |
| 2008/0202710 A1 | 8/2008 | Zahner | |
| 2009/0032659 A1 * | 2/2009 | Goldstein | A47H 1/02 |
| | | | 248/220.21 |
| 2009/0050497 A1 | 2/2009 | Chang | |
| 2010/0319858 A1 | 12/2010 | Freedland | |
| 2012/0000616 A1 * | 1/2012 | DeWees | A47H 1/04 |
| | | | 160/330 |
| 2012/0018106 A1 | 1/2012 | Robledo | |
| 2014/0272188 A1 * | 9/2014 | Rose | C09D 7/61 |
| | | | 427/543 |

FOREIGN PATENT DOCUMENTS

| | | | |
|---|---|---|---|
| DE | 3526744 | | 1/1987 |
| DE | 202013000922 U1 | | 6/2013 |
| EP | 1894500 | | 8/2007 |
| GB | 2458075 | | 7/2011 |
| WO | 2004/058015 | | 7/2004 |
| WO | 2008/076260 | | 6/2008 |
| WO | 2014/117928 | | 8/2014 |
| WO | WO-2014117928 A1 * | 8/2014 | ............ A47H 13/04 |

OTHER PUBLICATIONS

Minor Procedure Drapes by Busse Hospital; Medline Catalog; http://www.medline.com/catalog/catalog/jsp; Unknown publication date but believe to be prior to present application filing date.

Sterile Fields Drapes by Busse Hospital; Medline Catalog; http://www.medline.com/catalog/catalog/jsp; Unknown publication date but believe to be prior to present application filing date.

Tissue Drapes; Medline Catalog; http://www.medline.com/catalog/catalog/jsp; Unknown publication date but believe to be prior to present application filing date.

Tissue/Poly Drapes by Busse Hospital; Medline Catalog; http://www.medline.com/catalog/catalog/jsp; Unknown publication date but believe to be prior to present application filing date.

Johnson, Blair, "Final OA", U.S. Appl. No. 14/549,393, filed Nov. 20, 2014; dated Jan. 30, 2017.

Johnson, Blair, "NonFinal OA", U.S. Appl. No. 14/459,393, filed Nov. 20, 2014; dated Mar. 9, 2016.

Johnson, Blair, "NonFinal OA", U.S. Appl. No. 14/549,393, filed Nov. 20, 2014; dated Aug. 17, 2016.

Johnson, Blair, "Notice of Allowance", U.S. Appl. No. 14/549,393, filed Nov. 20, 2014; dated Sep. 22, 2017.

\* cited by examiner

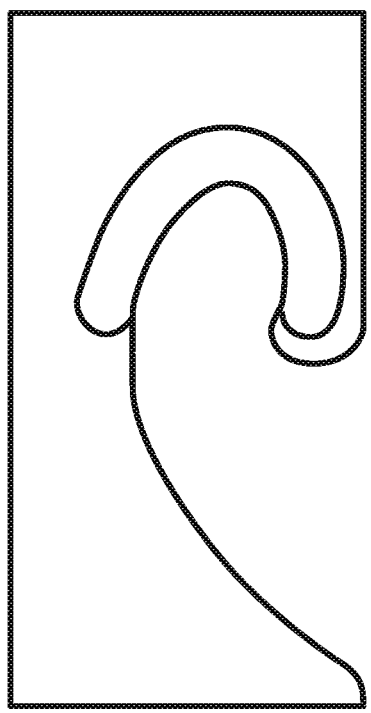
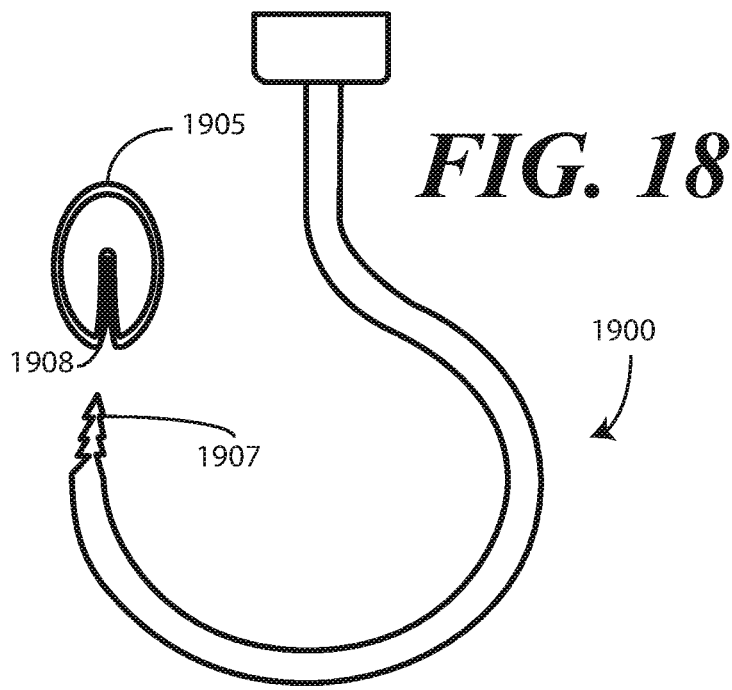
*FIG. 18*
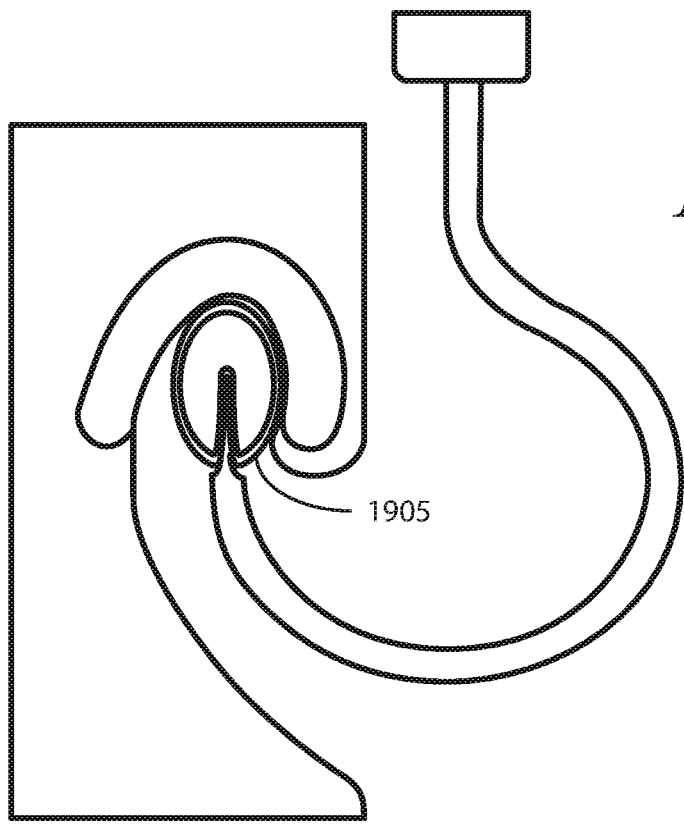
*FIG. 19*

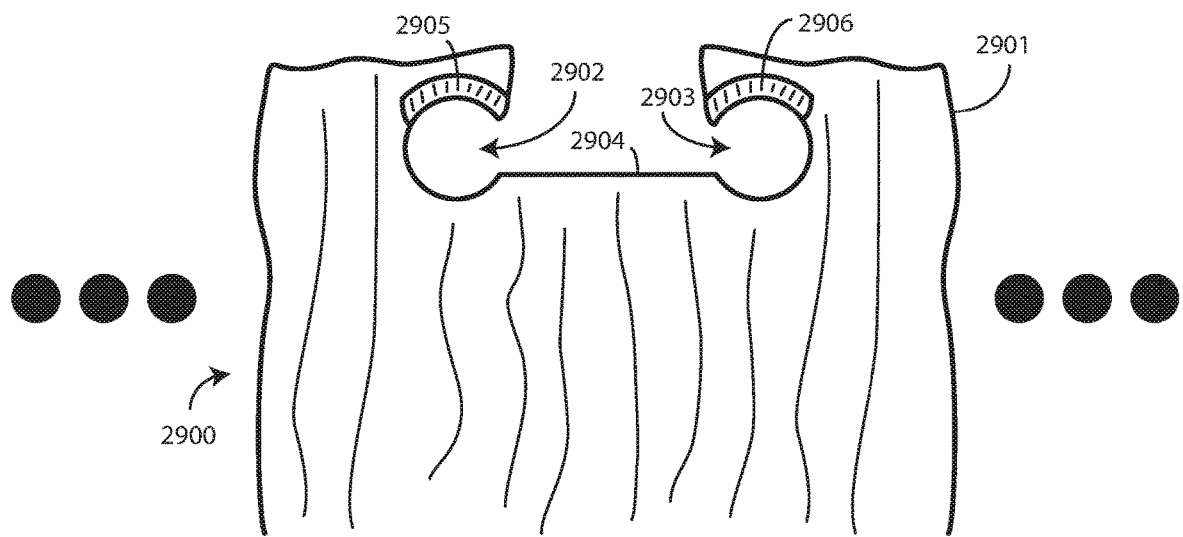
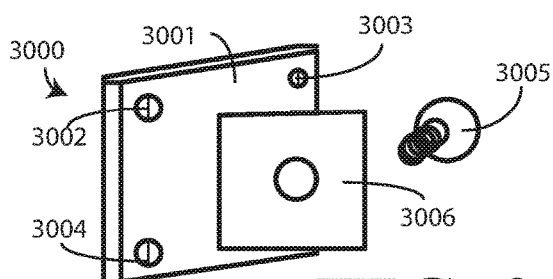
*FIG. 29*
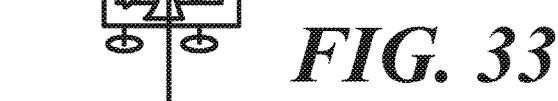
*FIG. 30*
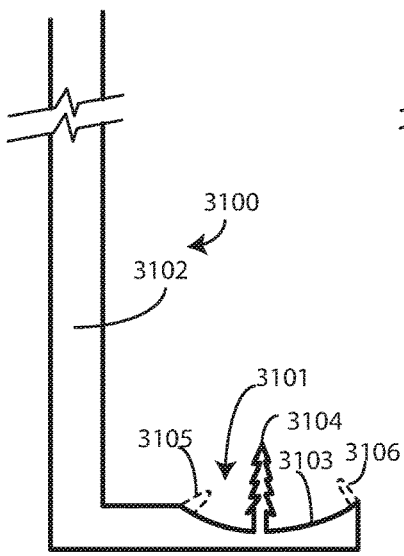
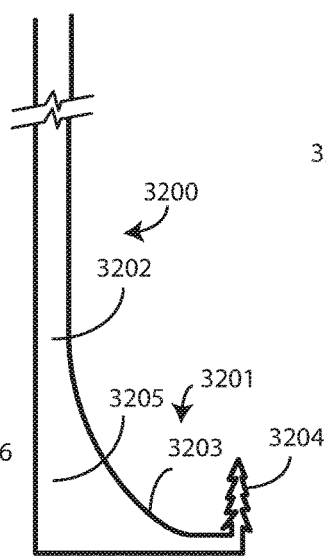
*FIG. 31*  *FIG. 32*
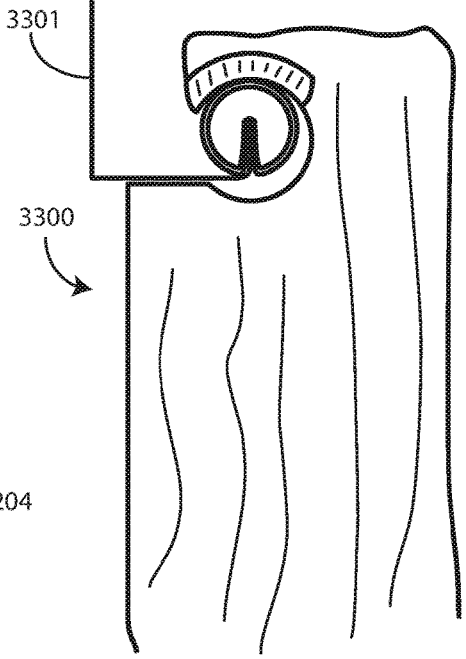
*FIG. 33*

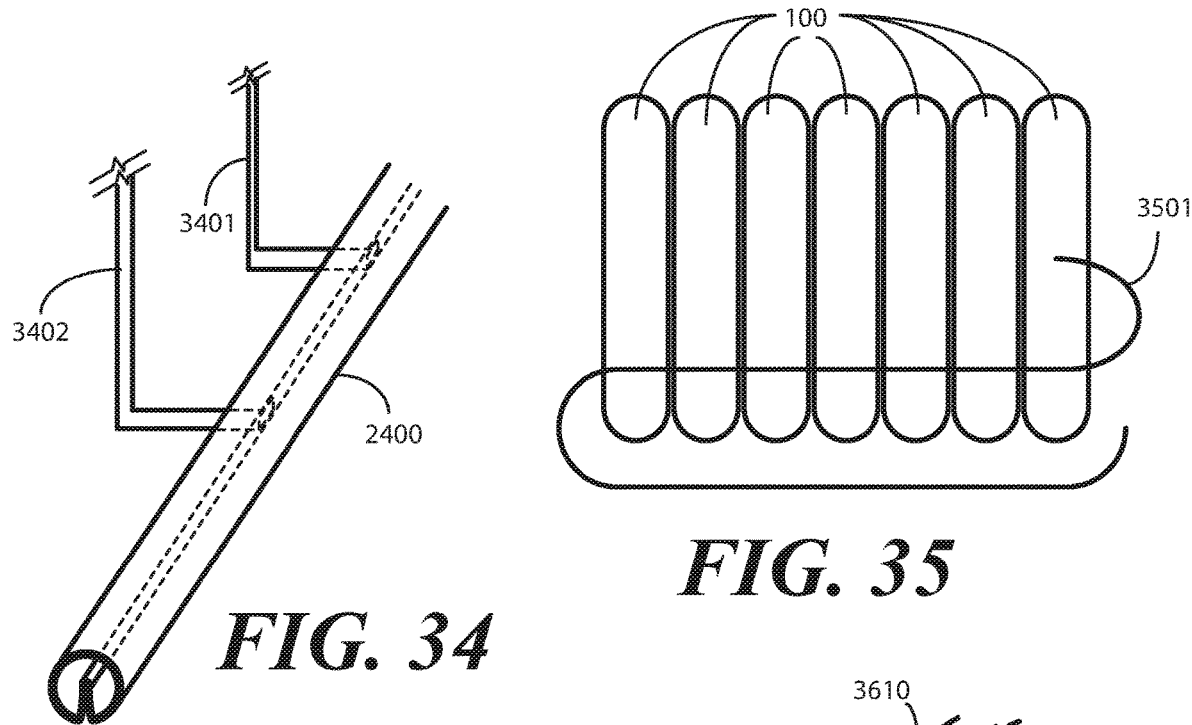
FIG. 34
FIG. 35
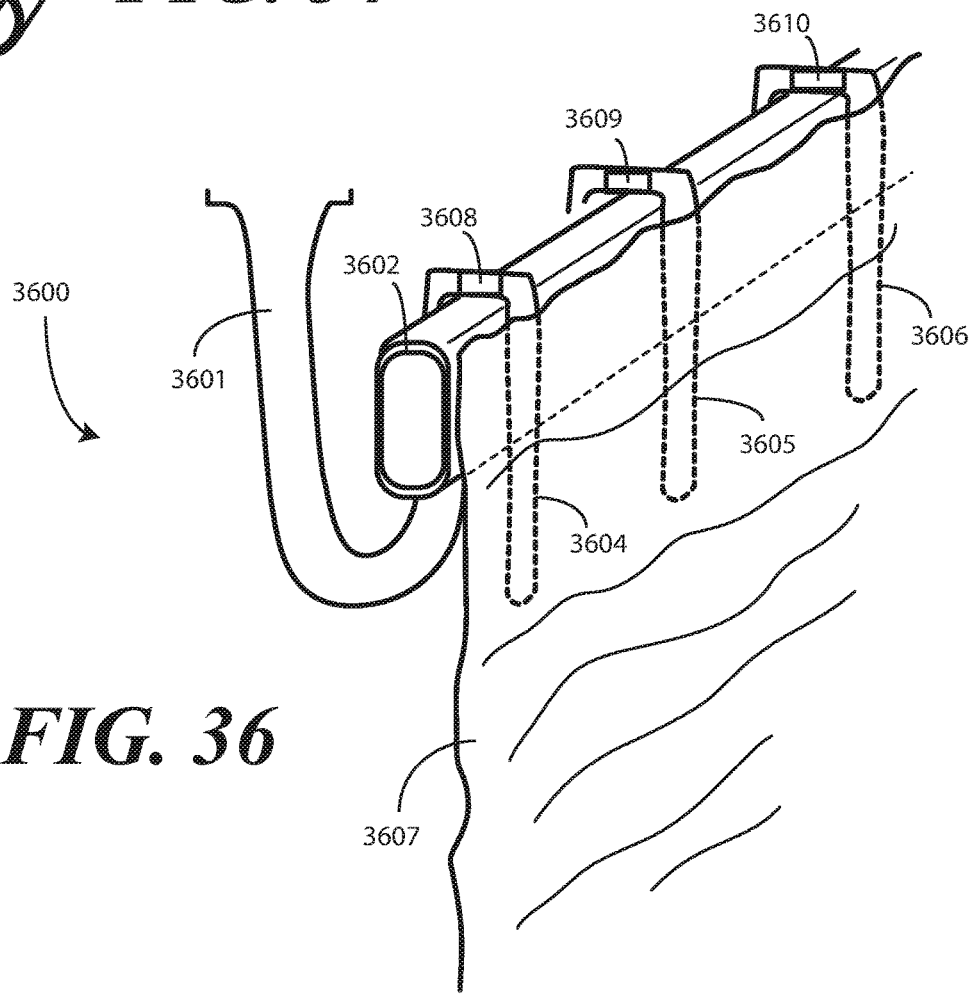
FIG. 36

HANGABLE APPARATUS AND SYSTEMS AND METHODS THEREFOR

CROSS REFERENCE TO PRIOR APPLICATIONS

This application is a continuation-in-part under 35 USC § 120, claiming priority to U.S. Ser. No. 14/549,393, filed Nov. 20, 2014, which claims priority and benefit under 35 U.S.C. § 119(e) from U.S. Provisional Application No. 61/907,306, filed Nov. 21, 2013, each of which is incorporated by reference for all purposes.

BACKGROUND

Technical Field

This disclosure relates generally to hangable devices, and more particularly to an items comprising a hanger that hangs from a rail or track.

Background Art

Hanging items are popular in homes and businesses. Hanging items include curtains, drapes, plants, art, and so forth. Hanging items typically include a hanger, a mount, and something suspended from the hanger. Using a plant as one example, the hanger may comprise a metal hook, with the plant suspended beneath the hook. A user may couple the hook to a loop, perhaps mounted on the ceiling, to hang the plant.

While there are a variety of types of hangers and types of hanging items, curtains provide special challenges for designers. This is especially true in medical or hospital environments. It is frequently the case that medical service providers employ curtains to separate patients, conceal medical procedures from view, and to segregate areas of operating rooms and care centers. It is advantageous to launder such curtains to prevent the curtains from acting as a vector to transfer pathogens and bacteria from one patient to the next. However, prior art curtains are difficult to remove from their mounting rods. The dismounting process is costly and labor intensive. Additionally, a most prior art medical curtains use metal hangers, the dismounting process is noisy and therefore aggravating to patients and medical practitioners. Consequently, few prior art curtains get laundered as frequently as they should.

It would be advantageous to have an improved hangable apparatus, suitable for use in curtain and drape systems, that is easier and quieter to dismount.

BRIEF DESCRIPTION OF THE DRAWINGS

FIGS. 18-19 illustrate an alternate hanging system in accordance with one or more embodiments of the disclosure.

FIG. 29 illustrates one explanatory hanging item in accordance with one or more embodiments of the disclosure.

FIG. 30 illustrates one explanatory bracket in accordance with one or more embodiments of the disclosure.

FIG. 31 illustrates one explanatory track hanger in accordance with one or more embodiments of the disclosure.

FIG. 32 illustrates another explanatory track hanger in accordance with one or more embodiments of the disclosure.

FIG. 33 illustrates one explanatory hanging system in accordance with one or more embodiments of the disclosure.

FIG. 34 illustrates one explanatory track system in accordance with one or more embodiments of the disclosure.

FIG. 35 illustrates one explanatory hangable item in accordance with one or more embodiments of the disclosure.

FIG. 36 illustrates one explanatory hanging system in accordance with one or more embodiments of the disclosure.

Figure 1:
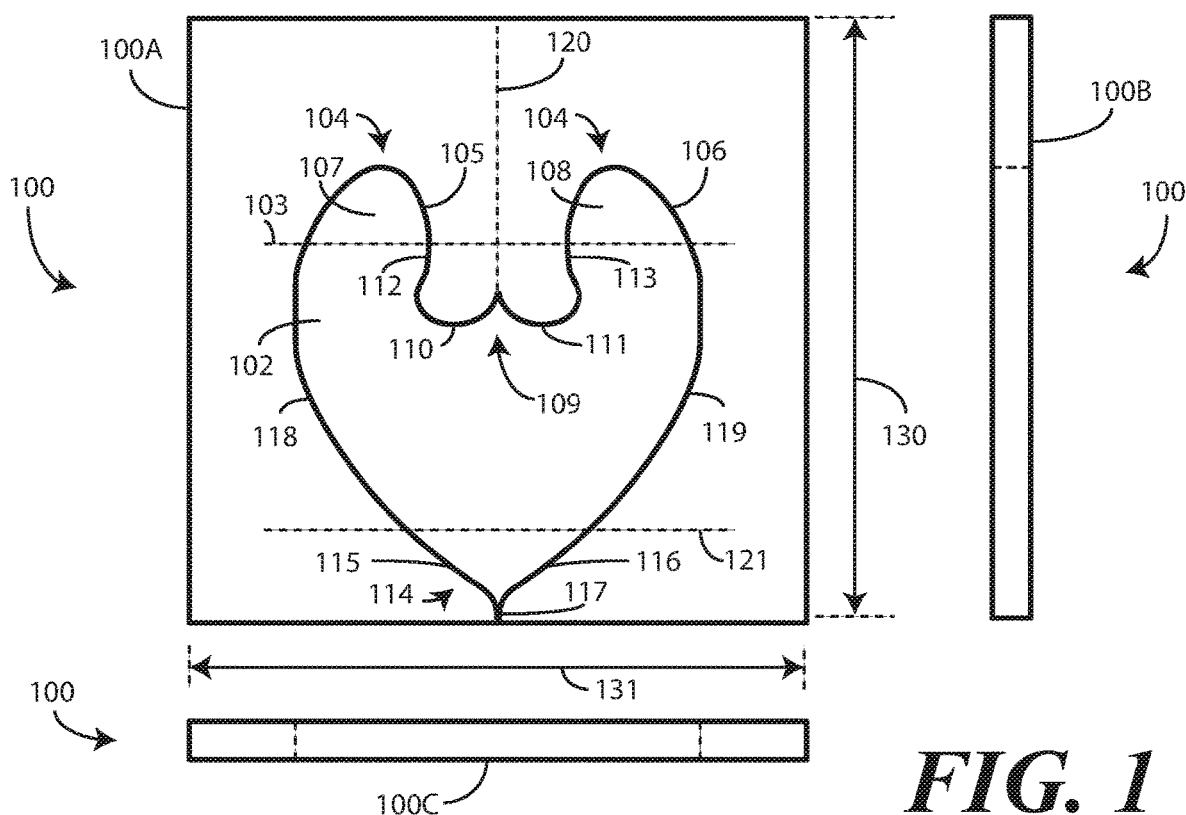
FIG. 1 illustrates one explanatory hanger in accordance with one or more embodiments of the disclosure.

Skilled artisans will appreciate that elements in the figures are illustrated for simplicity and clarity and have not necessarily been drawn to scale. For example, the dimensions of some of the elements in the figures may be exaggerated relative to other elements to help to improve understanding of embodiments of the present disclosure.

DETAILED DESCRIPTION OF THE DRAWINGS

Embodiments of the disclosure are now described in detail. Referring to the drawings, like numbers indicate like parts throughout the views. Apparatus components and method steps have been represented where appropriate by conventional symbols in the drawings, showing only those specific details that are pertinent to understanding the embodiments of the present disclosure so as not to obscure the disclosure with details that will be readily apparent to those of ordinary skill in the art having the benefit of the description herein.

As used in the description herein and throughout the claims, the following terms take the meanings explicitly associated herein, unless the context clearly dictates otherwise: the meaning of "a," "an," and "the" includes plural reference, the meaning of "in" includes "in" and "on." Relational terms such as first and second, top and bottom, and the like may be used solely to distinguish one entity or action from another entity or action without necessarily requiring or implying any actual such relationship or order between such entities or actions. Also, reference designators shown herein in parenthesis indicate components shown in a figure other than the one in discussion. For example, talking about a device (10) while discussing figure A would refer to an element, 10, shown in figure other than figure A.

Embodiments of the disclosure provide a hanger for an item. In one embodiment, the item to be hung is a curtain. Illustrating by example, for a hospital setting where infection control is an area of high concern, hangers configured in accordance with embodiments of the disclosure can be used to hang curtains between patients, procedures, areas, and so forth. Hangers configured in accordance with embodiments of the disclosure are easier to mount and dismount, thereby making it easier for health care practitioners to change and launder the curtains to ensure that bacteria and other pathogens are not readily transferred from patient to patient or from patient to health care practitioner.

Embodiments of the disclosure contemplate that it is very difficult to change prior art curtain systems designed for health care environments. The hangers are difficult to dismount from their tracks. Additionally, dust can collect in upwardly open tracks, thereby causing the hangers to get stuck within those tracks. Multiple people with ladders and specialized equipment are required to dismount the curtains, making changing or laundering the curtains a labor-intensive and costly endeavor. For this reason, curtains are rarely changed or washed. Experimental testing by the inventors reported that in some environments, it was considered fortunate if the curtains were changed three times a year. Advantageously, embodiments of the disclosure are quick and simple to mount and dismount, requiring only a single person for a few minutes to change the curtains. Accordingly, embodiments of the disclosure allow for more frequent changing and laundering of curtains, thereby promoting health and safety when embodiments of the disclosure are used in hospitals or other health care settings.

In addition to potentially serving as vectors for bacteria and other pathogens, prior art curtain hanging systems have other problems as well. As noted above, ladders are frequently required to mount or dismount prior art systems. Risk of injury increases when a worker steps on a ladder, as the worker may fall while mounting or dismounting the curtains. Advantageously, embodiments of the disclosure eliminate the need for a ladder, thereby making mounting and dismounting operations in accordance with embodiments of the disclosure safer.

In one embodiment, a hanger for an item comprises a uniquely configured aperture that facilitates simple mounting and dismounting of the hanger to a track. In one embodiment, the aperture comprises a split rotated concave cardioid upper contour. The split rotated concave cardioid upper contour can comprise a first portion and a second portion. In one embodiment, this first portion and second portion are separated by an inverted convex cardioid suspended into the aperture by sidewalls. In one embodiment, the sidewalls are concave relative to the aperture.

In one embodiment, the lower contour of the aperture comprises a cusp. The cusp can be oriented in the center of the lower contour of the aperture. A fold line can be defined between the center of the inverted convex cardioid to the cusp. The hanger can be folded along the fold line to transform the aperture into a track receiver comprising an open side formed along the fold line and a closed side formed by the outer contour of the aperture. The hanger can then be quickly and easily mounted on a track by placing the track receiver about a track such that the track seats within lobes formed by the split rotated concave cardioid upper contour.

Turning now to FIG. 1, illustrated therein is one explanatory hanger 100 configured in accordance with one or more embodiments of the disclosure. The hanger 100 is shown in front elevation view 100a, side elevation view 100b, and top plan view 100c. In one embodiment, the hanger 100 is manufactured from a woven mesh 101. For example, the woven mesh 101 can be a synthetic woven mesh, such as a woven mesh of nylon, polyester, plastic, or other synthetic fibers. In one embodiment, the woven mesh 101 is about three inches wide, which is from top to bottom as viewed in FIG. 1.

In one or more embodiments, the woven mesh 101 is configured to be launderable. Accordingly, when an item, such as a curtain or other item, is attached to the hanger 100, the entire assembly can be placed into a washing machine for laundering. Employing a woven mesh 101 as the hanger material advantageously allows the hanger to be used with curtains in a hospital or other medical environment, as the woven mesh 101 and curtain coupled thereto can be quickly and easily washed in a single operation.

As shown in FIG. 1, the hanger 100 defines an aperture 102. The aperture 102 includes various contours configured to facilitate easy mounting and dismounting of the hanger 100 to a track. The hanger 100 can be configured in a variety of sizes. For example, the length 130 and width 131 of the hanger can be between two and six inches in one or more embodiments. These dimensions are illustrative only, as others will be obvious to those of ordinary skill in the art having the benefit of this disclosure.

In the illustrative embodiment of FIG. 1, five primary contours are shown. Beginning at the top of the aperture 102, a split rotated concave cardioid upper contour 104 is present above delineation 103. The split rotated concave cardioid upper contour 104 is "split" because it includes a first portion 105 and a second portion 106 that are separated, rather than being connected as would be the case in a traditional cardioid. The first portion 105 and the second portion 106 of the split rotated concave cardioid upper contour 104 are "concave" because each defines a concave lobe 107,108 relative to the aperture 102. The concave lobes 107,108 are complementary to each other in shape in this embodiment. Said differently, each upper concave lobe, e.g., lobe 107, comprises and/or defines a contour of complementary to the other upper concave lobe, e.g., lobe 108, in this embodiment.

Use of the split rotated concave cardioid upper contour 104 is advantageous in many applications because it facilitates quick and simple mounting and dismounting of the hanger 100 from a track. However, it will be obvious to those of ordinary skill in the art having the benefit of this disclosure that a split rotated concave cardioid is but one shape suitable for the upper contour of the aperture. Segmented linear contours could be used as well. For example, the first portion 105 and the second portion 106 could be triangular, rectangular, multi-segmented, or free form, instead of curved with the curve defined by the split rotated concave cardioid upper contour 104.

In this embodiment, the first portion 105 and the second portion 106 of the split rotated concave cardioid upper contour 104 are separated by an inverted convex cardioid 109 that extends inwardly into the aperture 102. The inverted convex cardioid 109 forms the second primary contour of the aperture 102 in this embodiment. The inverted convex cardioid 109 is "inverted" because its cardioidal lobes 110,111 are 180 degrees out of phase with those of the first portion 105 and the second portion 106 of the split rotated concave cardioid upper contour 104. The inverted convex cardioid 109 is "convex" because its cardioidal lobes 110,111 define convex surfaces relative to the interior of the aperture.

Use of the inverted convex cardioid 109 is advantageous in many applications because it provides a reliable retention device without interrupting the quick and simple mounting and dismounting capabilities of the hanger 100 from a track. However, it will be obvious to those of ordinary skill in the art having the benefit of this disclosure that an inverted convex cardioid is but one shape suitable for the second primary contour of the aperture 102. Segmented linear contours could be used as well. For example, the cardioidal lobes 110,111 could be triangular, rectangular, multi-segmented, or free form, instead of curved with the curve defined by the inverted convex cardioid 109.

In one embodiment, the inverted convex cardioid 109 is suspended into the aperture 102 by two sidewalls 112,113. The two sidewalls 112,113 define the third primary contour of the aperture 102. In this illustrative embodiment, the two sidewalls 112,113 are concave relative to an interior of the aperture 102. In another embodiment, the two sidewalls 112,113 are substantially straight. In yet another embodiment, the two sidewalls 112, 113 comprise free-form contours that correspond to the outer surface of a track to which the hanger 100 is mounted. Other shapes for the two sidewalls 112,113 will be obvious to those of ordinary skill in the art having the benefit of this disclosure.

Figure 2:
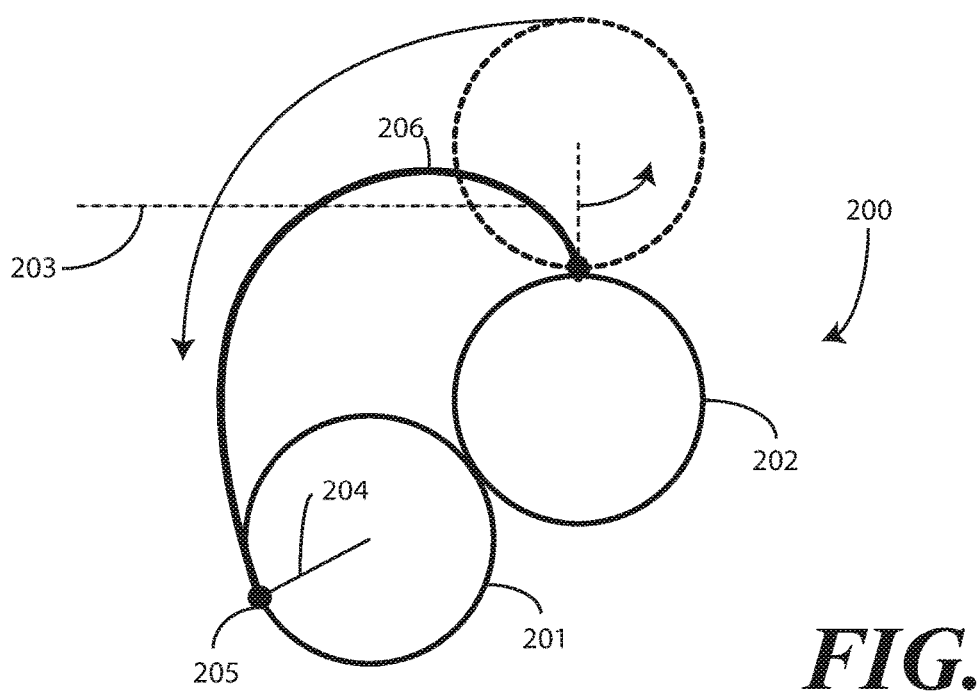
FIG. 2 illustrates an explanatory method of defining a cardioid in accordance with one or more embodiments of the disclosure.

Turning briefly to FIG. 2, illustrated therein is a method 200 of generating a cardioid for use as either the first portion (105) and the second portion (106) of the split rotated concave cardioid upper contour (104), or alternatively to generate the cardioidal lobes (110,111) of the inverted convex cardioid (109) in accordance with embodiments of the disclosure. In traditional cardioids, a circle 201 of fixed radius 204 is rotated about another circle 202, with a point 205 at the intersection of the fixed radius 204 drawing the cardioid 206. A bisecting line 203 can then cut the cardioid 206 to form either the first portion (105) and the second portion (106) of the split rotated concave cardioid upper contour (104), or alternatively the cardioidal lobes (110,111) of the inverted convex cardioid (109).

While this is one method 200 of generating a cardioid for use as either the first portion (105) and the second portion (106) of the split rotated concave cardioid upper contour (104), or alternatively to generate the cardioidal lobes (110, 111) of the inverted convex cardioid (109), in other embodiments, the radius of either circle 201 or circle 202 can vary in accordance with a predefined function as circle 201 rotates about circle 202. For example, either radius can vary in accordance with a linear function, a non-linear function, a polar equation based upon rotation of circle 201 about circle 202, or by parametric equations varying the radii of both circle 201 and circle 202 together. Accordingly, when radii of circle 201 and circle 202 vary, the contours of either the first portion (105) and the second portion (106) of the split rotated concave cardioid upper contour (104), or alternatively the cardioidal lobes (110,111) of the inverted convex cardioid (109), can take a variety of slopes there along as desired by a particular track design or application.

Turning now back to FIG. 1, the bottom of the aperture 102 is defined by an intersecting concave lower contour 114. The intersecting concave lower contour 114 forms the fourth primary contour of the aperture 102 in this embodiment. The intersecting concave lower contour 114 is "intersecting"

because a first side 115 and a second side 116 intersect in the middle of the intersecting concave lower contour 114. The intersecting concave lower contour 114 is "concave" because it defines a concave contour relative to the interior of the aperture 102.

In this illustrative embodiment, the intersecting concave lower contour 114 comprises a cusp 117. The cusp 117 of this illustrative embodiment defines a downwardly directed point at the base of the aperture 102. Inclusion of a cusp 117 is optional. In other embodiments the first side 115 and the second side 116 of the intersecting concave lower contour 114 will define a smooth contour at the base of the aperture 102. Other intersecting contours at the base of the aperture 102 will be obvious to those of ordinary skill in the art having the benefit of this disclosure.

The fifth primary contour is defined by the first side contour 118 and the second side contour 119. In this embodiment, each of the first side contour 118 and the second side contour 119 is a concave contour disposed between delineation 103 and delineation 121. In other embodiments, the first side contour 118 and the second side contour 119 can be straight. In other embodiments, the first side contour 118 and the second side contour 119 are convex, or take free-form shapes corresponding to a track to which the hanger 100 will be attached. In one embodiment, the first side contour 118 and the second side contour 119 begin farther apart at delineation 103 and terminate closer together at delineation 121.

Figure 3:
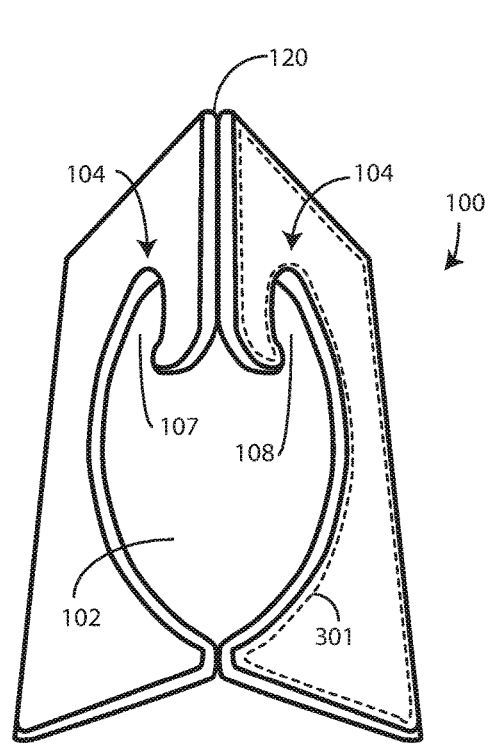
FIG. 3 illustrates one explanatory folded hanger in accordance with one or more embodiments of the disclosure.

The hanger 100 is configured to fold in one or more embodiments. Illustrating by example, the hanger 100 of FIG. 1 comprises a fold line 120 running from a center of the inverted convex cardioid 109 to the cusp 117. Turning to FIG. 3, illustrated therein is the hanger 100 after being partially folded about the fold line 120. As shown in FIG. 3, the hanger 100 can be folded along the fold line 120 to transform the aperture 102 into a track receiver comprising an open side formed along the fold line and a closed side formed by the outer contour of the aperture 102. The hanger 100 can then be quickly and easily mounted on a track by placing the track receiver about a track such that the track seats within lobes 107,108 formed by the split rotated concave cardioid upper contour 104. The track receiver will be shown in more detail below with reference to FIG. 4.

Figure 4:
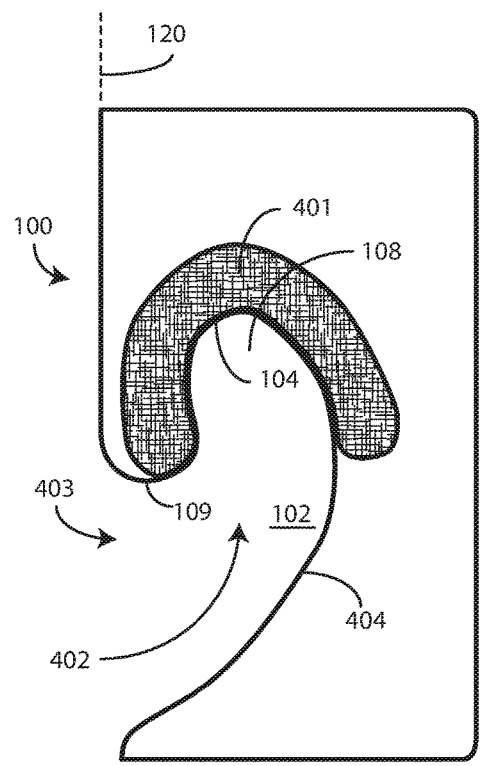
FIG. 4 illustrates another explanatory folded hanger in accordance with one or more embodiments of the disclosure.

In one or more embodiments, a reinforcing device can be added to the hanger 100 to stiffen the hanger 100 and/or reinforce the perimeter of the aperture 102. The use of a reinforcing device is optional, as in one or more embodiments no reinforcing device is required to stiffen the hanger 100 and/or reinforce the perimeter of the aperture 102 due to the natural stiffness of the hanger material. For example, in FIG. 3 stitching 301 has been disposed along a perimeter of the aperture 102. Turning to FIG. 4, illustrated therein is a hanger 100 to which an optional rigid reinforcing device 401 is attached. In the illustrative embodiment of FIG. 4, the optional rigid reinforcing device 401 is disposed about at least a portion of the split rotated concave cardioid upper contour 104. In one embodiment, the rigid optional reinforcing device 401 comprises a plastic device that is stitched, adhesively attached, or otherwise bonded to the hanger 100.

In the view of FIG. 4, the track receiver 402 formed when the hanger 100 is folded along the fold line 120 can more readily be seen. As noted above, the hanger 100 can be folded along the fold line 120 to transform the aperture 102 into a track receiver 402. In one embodiment, the width of the inverted convex cardioid is sufficiently wide as to move a center of gravity of the hanger 100 and/or the hanger 100 and a hanging item suspended by the hanger to be beneath an apex of the lobe 108 created by the split rotated concave cardioid upper contour 104.

In this embodiment, the track receiver 402 comprises an open side 403 formed along the fold line 120. The track receiver 402 also comprises a closed side 404 formed by the outer contour of the aperture 102. The hanger 100, when either partially or fully folded about the fold line 120, can then be quickly and easily mounted on a track by placing the track receiver 402 about a track such that the track seats within lobes 108 formed by the split rotated concave cardioid upper contour 104. This mounting will be shown in more detail with reference to FIGS. 11-13 below.

While an optional rigid reinforcing device 401 is used in FIG. 4 and optional stitching (301) in FIG. 3, it should be noted that these different reinforcing devices can be used in combination as well. Additionally, other reinforcing devices will be obvious to those of ordinary skill in the art having the benefit of this disclosure. As one example, the hanger 100 could be dipped into a resin to reinforce the aperture 102 as well.

Figure 5:
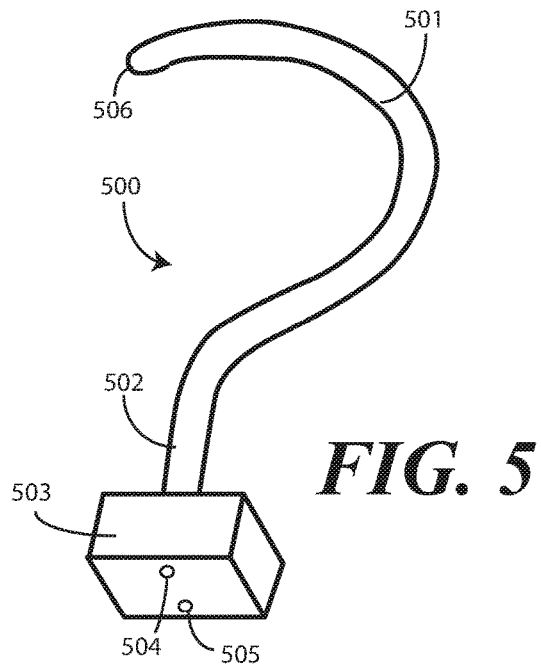
FIG. 5 illustrates one explanatory track hanger in accordance with one or more embodiments of the disclosure.

Turning now to FIG. 5, illustrated therein is one explanatory track hanger 500 configured in accordance with one or more embodiments. In one embodiment, the track hanger 500 is to suspend a track from a surface such as a wall or ceiling. This illustrative track hanger 500 includes a hook 501, an extension 502, and a base member 503. The base member 503 can optionally include one or more apertures 504,505 through which screws or other fasteners may be inserted to attach the base member 503 to a ceiling or other flat surface from which something is to be hung.

In one embodiment, the track hanger 500 is a unitary element, with each of the hook, extension 502, and base member 503 being formed as a single, integral unit. For example, in one embodiment the track hanger 500 is manufactured from a thermoplastic material by way of an injection molding process. The track hanger 500 can be manufactured from nylon, styrene, ABS, polycarbonate, or polycarbonate-ABS, PMMA, PVC, or other polyamide-based thermoplastics in one embodiment.

The extension 502 can be of varying lengths so as to lower the track, which will be attached to the tip 506 of the track hanger 500 in one embodiment, from a ceiling or other surface. Additionally, the diameter of the hook 501 can be altered to move the tip 506 farther from the ceiling as well. Of course, combinations of extending the extension 502 and increasing the diameter of the hook 501 can be used. By lowering the track from the ceiling by increasing the diameter of the hook 501, lengthening the extension 502, or combinations thereof, a user can more easily attach the hanger to the track, thereby simplifying the mounting and dismounting process. Making hanging and taking down processes simpler fosters more frequent laundering or curtains attached to hangers configured in accordance with embodiments of the disclosure, thereby creating a cleaner environment. In one embodiment, the track is lowered from the ceiling by about four inches by any of increasing the diameter of the hook 501, lengthening the extension 502, or combinations thereof.

Figure 6:
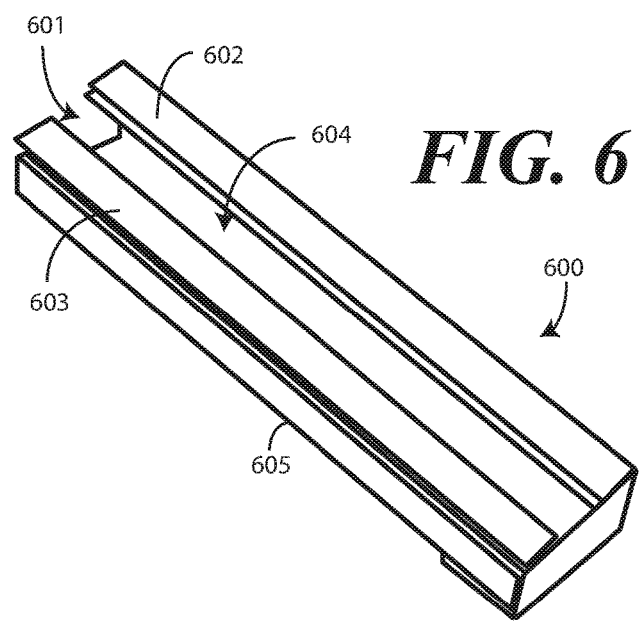
FIG. 6 illustrates a mounting rail for a track hanger in accordance with one or more embodiments of the disclosure.

In one or more embodiments, rather than employing the apertures 504,505 to attach the track hanger 500 to a ceiling or other surface, a track can be supplied into which the track hanger 500 may be inserted. Turning now to FIG. 6, illustrated therein is one example of such a track 600.

In one embodiment, the track 600 is manufactured from metal. In one embodiment, the track has its base 605 attached directly to a flat surface, such as a wall or ceiling.

In another embodiment, the base 605 of the track is recessed into a wall or ceiling such that the rails 602,603 of the track 600 are flush with the surface.

The track 600 includes at least one receiving opening 601 disposed at an end. The base member (503) of the track hanger (500) can be inserted into the receiving opening 601 to attach the track hanger (500) to the track 600. Two rails 602,603 are separated by a slot 604. When the base member (503) of the track hanger (500) is inserted into the receiving opening 601 of the track 600, the extension (502) can pass through the slot 604. Accordingly, a user can move the track hanger (500) to any desired location along the track 600. Additionally, the user is free to position track hangers at any desired frequency, i.e., the user may space track hangers apart at any desired distance.

Figure 7:
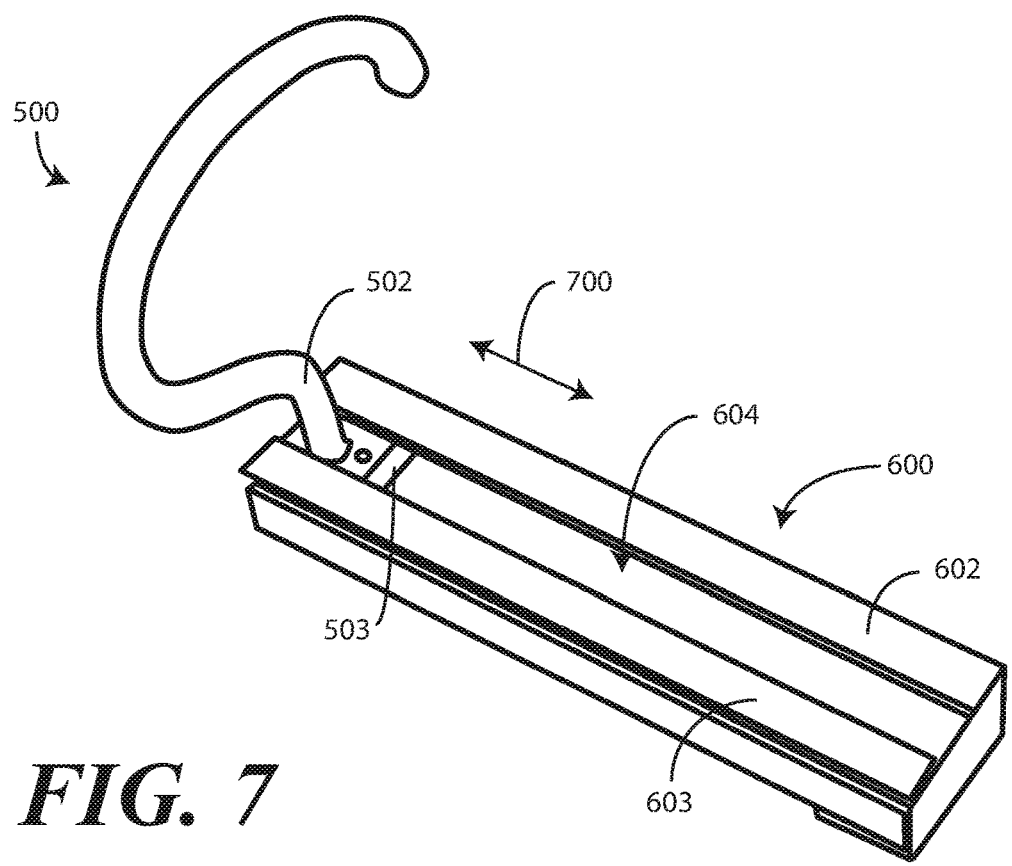
FIGS. 7-8 illustrate one explanatory track hanger seated within a mounting rail in accordance with one or more embodiments of the disclosure.
Figure 8:
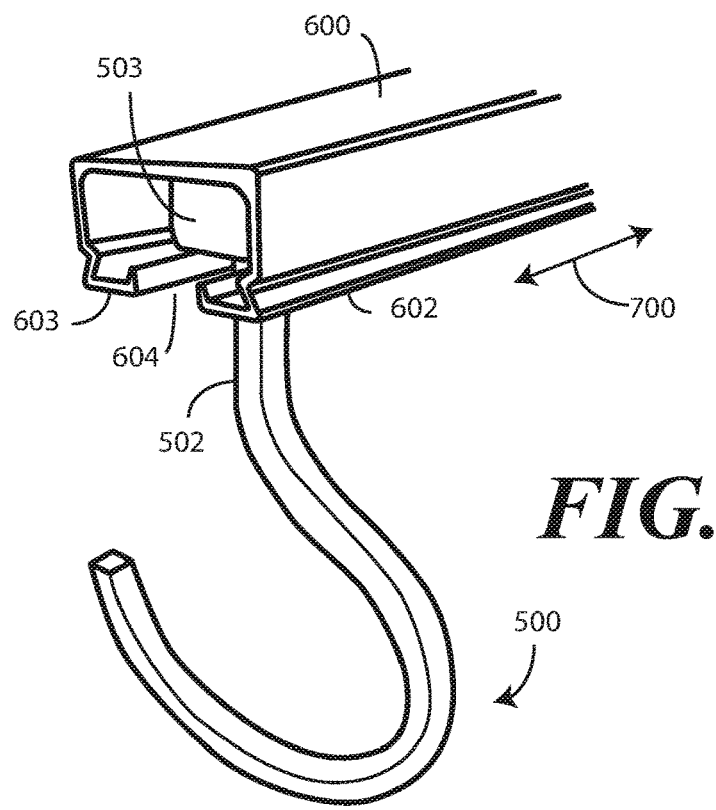

Turning now to FIGS. 7 and 8, illustrated therein is the track hanger 500 inserted into the track 600. As previously described, the extension 502 extends through the slot 604 while the base member 503 of the track hanger 500 is retained within the track 600 by the rails 602,603. Accordingly, the user simply slides 700 the track hanger 500 along the track 600 to a desired location. Additionally, the user can place as few or as many track hangers within the track 600 as desired, spacing them apart at any distance they choose. This "moveability" allows the track hangers to be repositioned and reconfigured within the track 600 at will.

Figure 9:
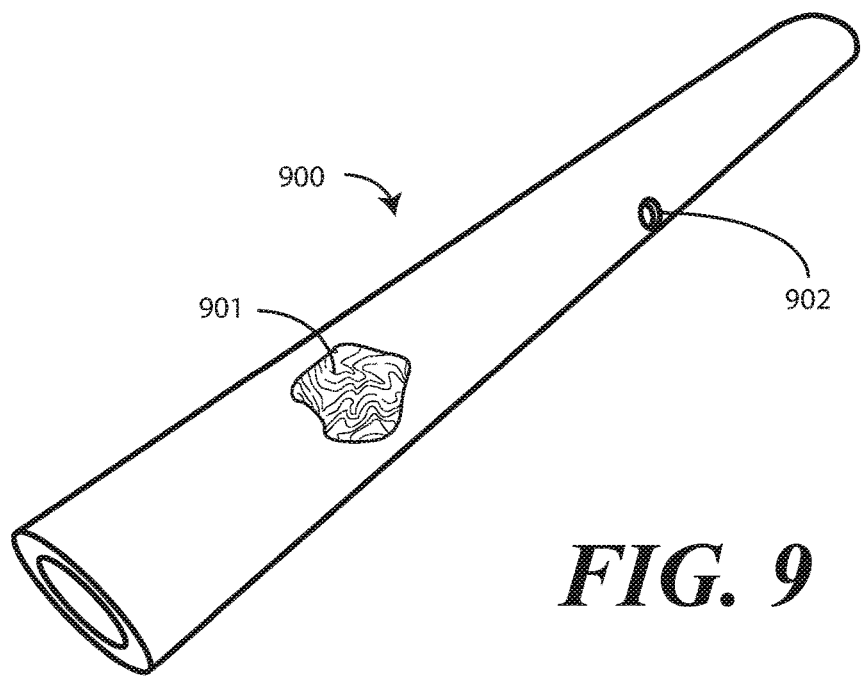
FIG. 9 illustrates one explanatory track in accordance with one or more embodiments of the disclosure.

Turning now to FIG. 9, illustrated therein is one explanatory track 900 configured in accordance with one or more embodiments of the disclosure. In this illustrative embodiment, the track 900 comprises a tube that is generally round in cross section. In one embodiment, the track 900 is flexible so that it can be shaped into different contours when attached to a track hanger (500). For example, in one embodiment the track 900 is manufactured from plastic. One suitable plastic for the track 900 is polyethylene, although other flexible materials will be obvious to those of ordinary skill in the art having the benefit of this disclosure. In one embodiment, the track 900 is manufactured from an extrusion process.

Figure 16:
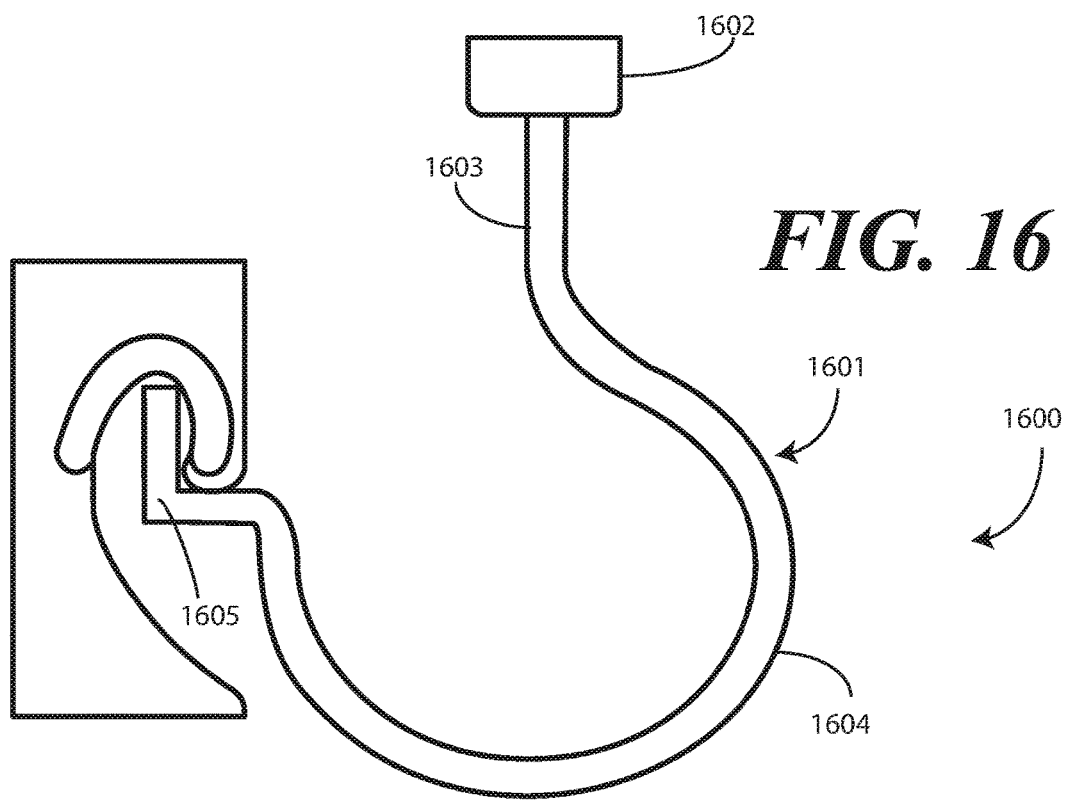
FIG. 16 illustrates an alternate hanging system in accordance with one or more embodiments of the disclosure.

In one embodiment, the track 900 is a continuous piece. In other embodiments, segments of different tracks can be aligned end-to-end to form a composite track. In one embodiment, the track 900 is malleable. While the cross section of the track 900 shown in FIG. 9 is generally circular, it should be noted that the cross section could take other shapes as well, such as ovular or flat. Some of these shapes will be shown below with reference to FIGS. 16 and 17.

In one embodiment the track 900 is configured so as to be easily cleaned. In one embodiment, the track 900 is manufactured so as to be light beige in color. In one embodiment, the track 900 is cut to predefined lengths, such as twenty-foot lengths. In one or more embodiments, the ends of the track 900 can be contoured for smooth interconnection to adjacent track segments.

In one embodiment, the track 900 comprises a coating 901. For example, in one embodiment the track 900 is coated with a silicon-based coating to allow hangers configured in accordance with one or more embodiments to more smoothly slide along the track 900. It should be noted that one primary advantage offered by embodiments of the disclosure is that hanging systems configured in accordance with embodiments of the disclosure are very, very quiet when in operation. For example, where the track 900 is manufactured from polyethylene and coated with silicon, and the hanger (100) is made from a woven polyester mesh, moving the hanger (100) along the track 900 is nearly a silent procedure. This is advantageous in hospitals and other medical environments where noise is problematic. Prior art hanging systems, which primarily include metal, are loud and intrusive. In one embodiment of the present disclosure, each of the track 900, the hanger (100), and any item attached thereto is made without any metal. This greatly reduces—if not eliminates—noise when the hangers are moved on the track 900.

A second advantage of not including metal in either the track 900 or the hanger (100) is that components of systems configured in accordance with various embodiments of the disclosure can be extremely light in weight. This enables the track 900 to easily be mounted on track hangers, and hangers attached to the track 900. The process can be accomplished by anyone, regardless of size or strength.

Figure 10:
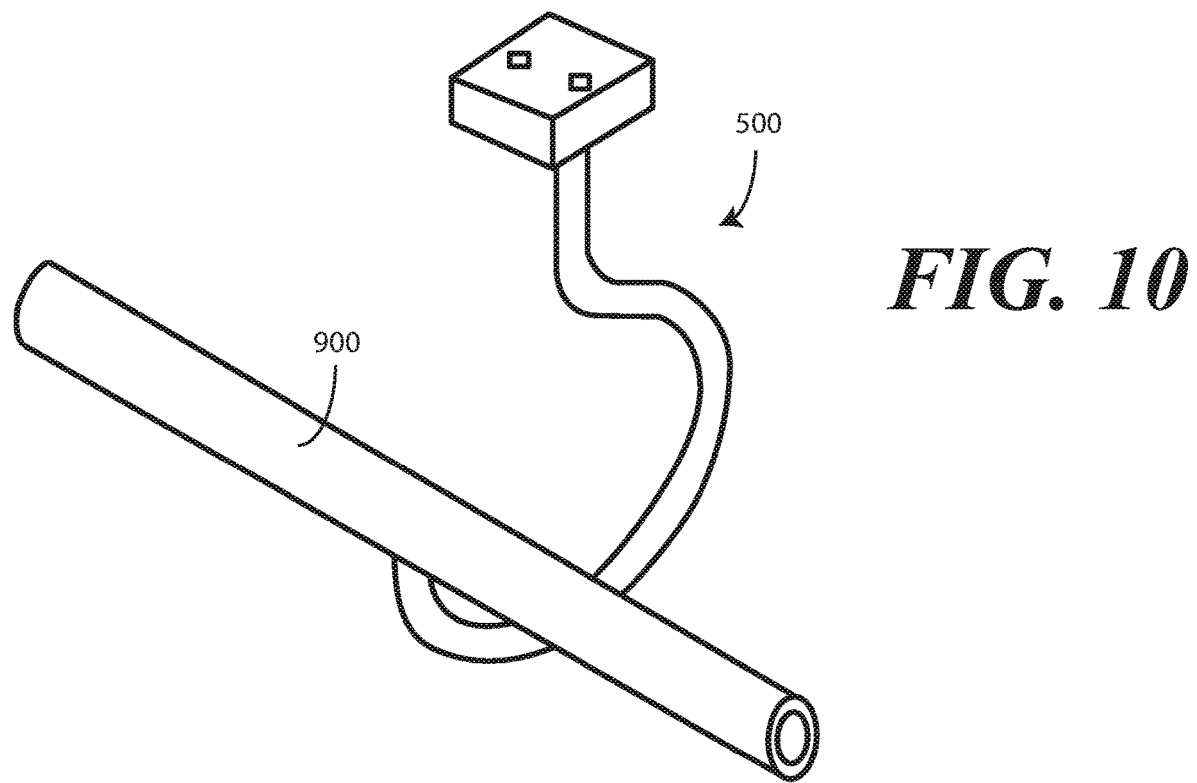
FIG. 10 illustrates one explanatory track system in accordance with one or more embodiments of the disclosure.

In one or more embodiments, one or more apertures 902 are disposed along the track 900. As will be shown in subsequent figures, the tip (506) of the hook (501) of a track hanger (500) can be inserted into the one or more apertures 902 to attach the track 900 to the track hanger (500). The one or more apertures 902 can be positioned at any desired location along the track 900 to facilitate attachment of track hangers at any desired point. In other embodiments, the track 900 may omit the one or more apertures 902. Where this occurs, the track material may be soft enough to allow the tip (506) of the hook (501) of a track hanger (500) to penetrate the track 900 to attach the track hanger (500) to the track 900. Turning now to FIG. 10, illustrated therein is a track hanger 500 having a track 900 attached thereto.

Figure 11:
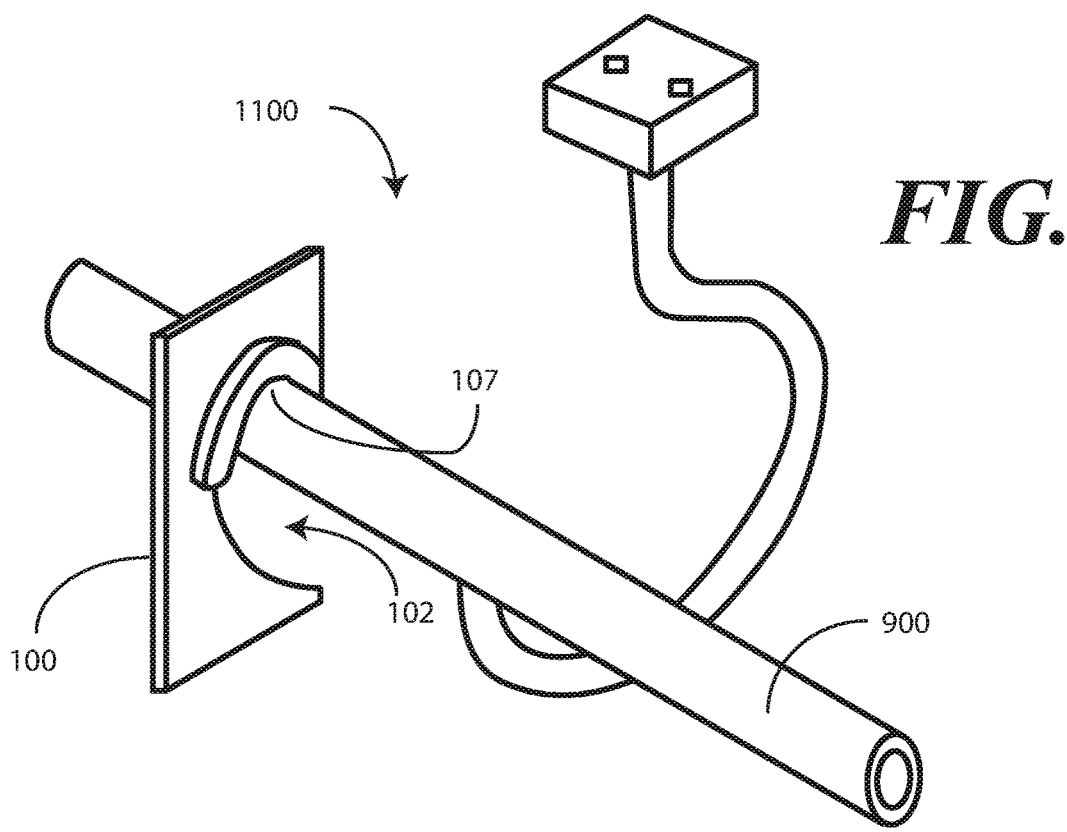
FIGS. 11-13 illustrate one explanatory hanger positioned on one explanatory track system configured in accordance with one or more embodiments of the disclosure.
Figure 12:
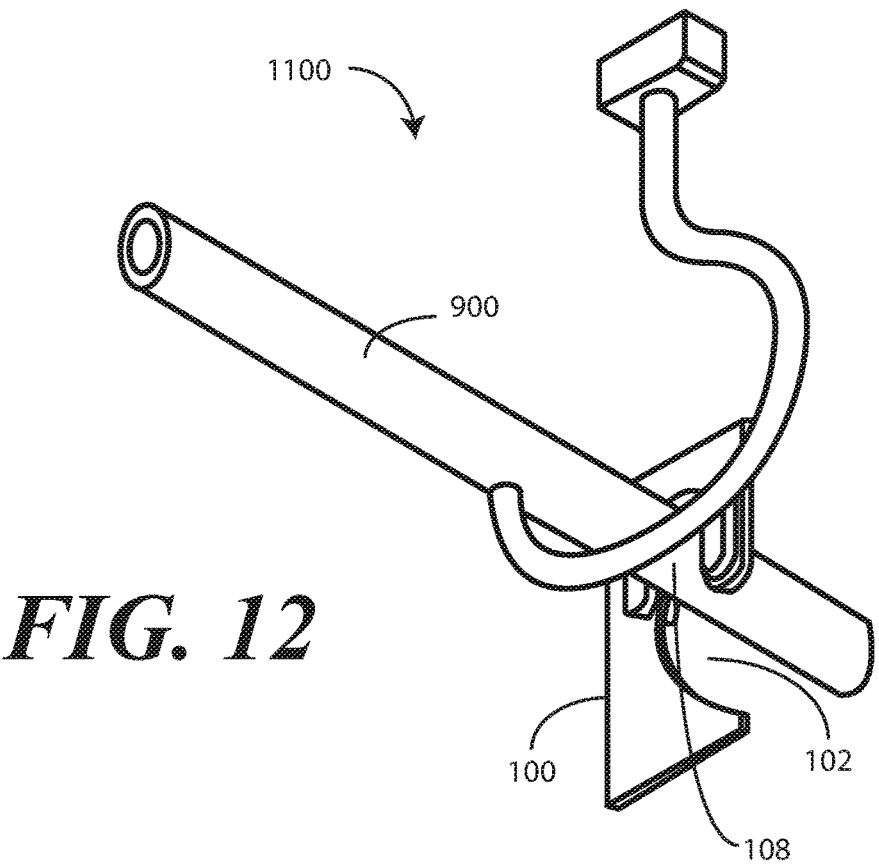
Figure 13:
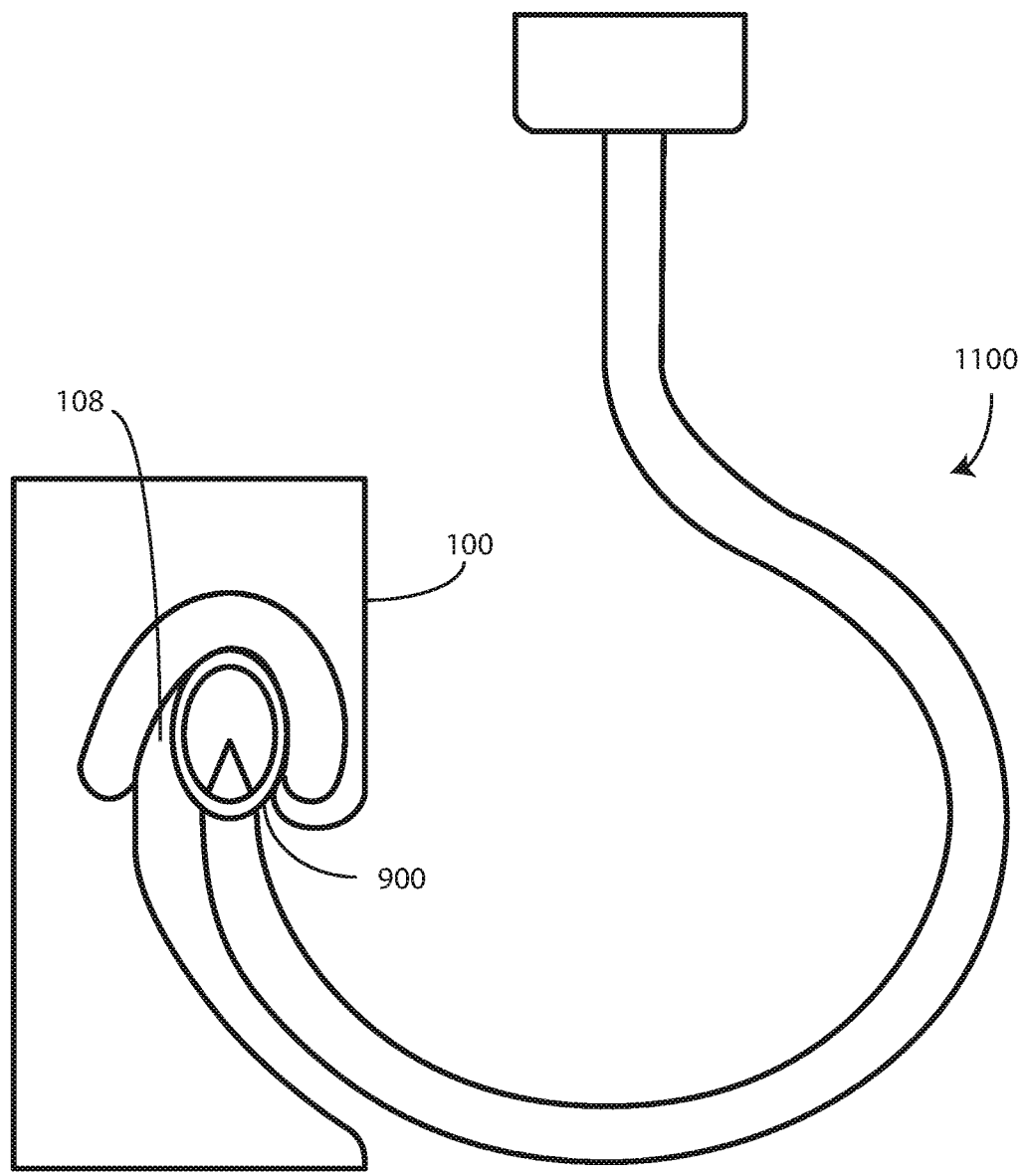

Once the track hanger 500 is either placed into a mounting track (600), or mounted directly to a wall or ceiling using screws or other fasteners placed through apertures (504,505) in the base member (503), the track 900 can be attached thereto to form a mounting system. After the mounting system is shaped as desired, one or more hangers having items hanging therefrom can be mounted on the track 900. Turning now to FIGS. 11-13, illustrated therein is a hanger 100 mounted on the track 900 in accordance with one or more embodiments.

Figure 14:
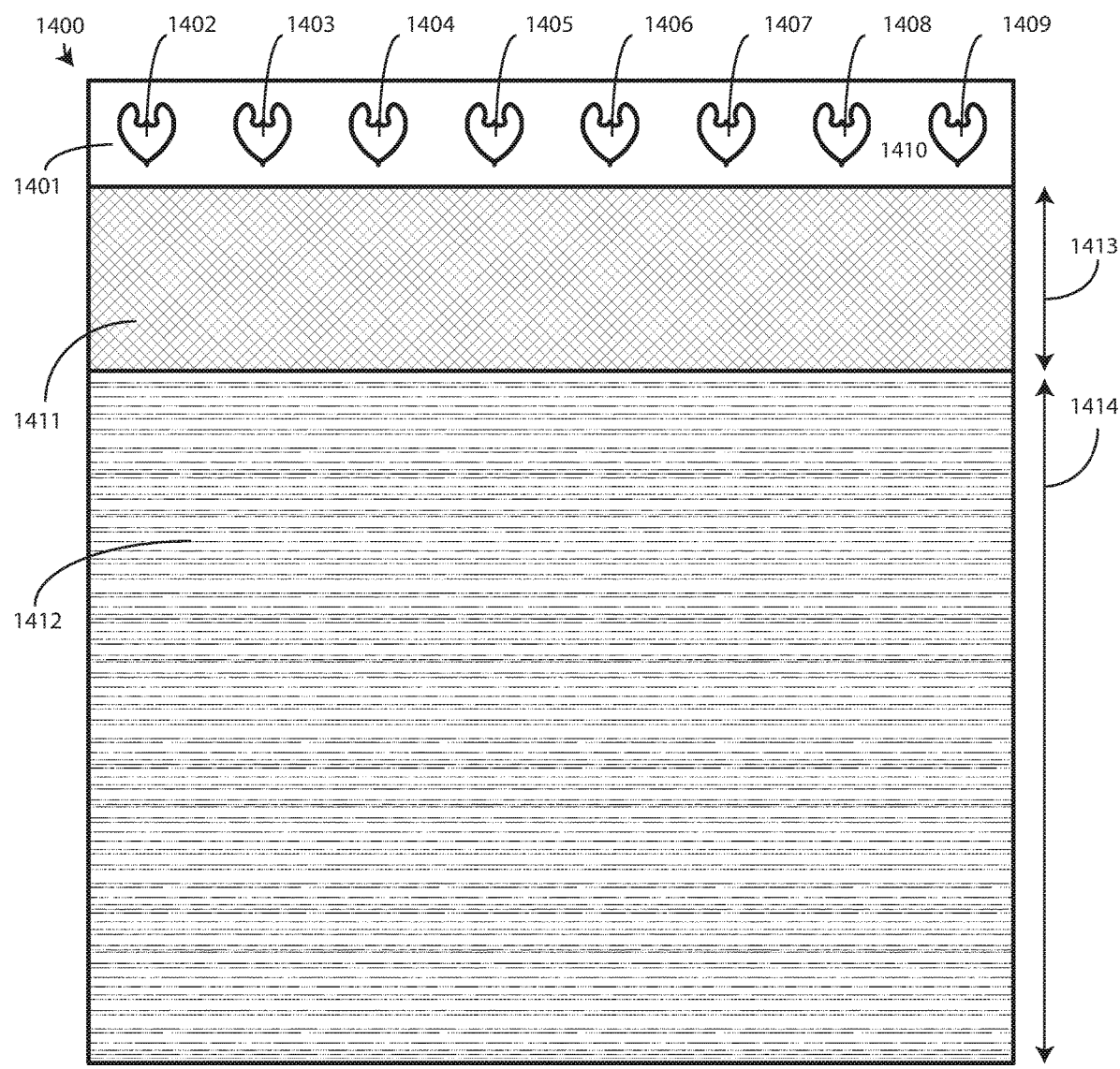
FIG. 14 illustrates one explanatory hangable item in accordance with one or more embodiments of the disclosure.
Figure 15:
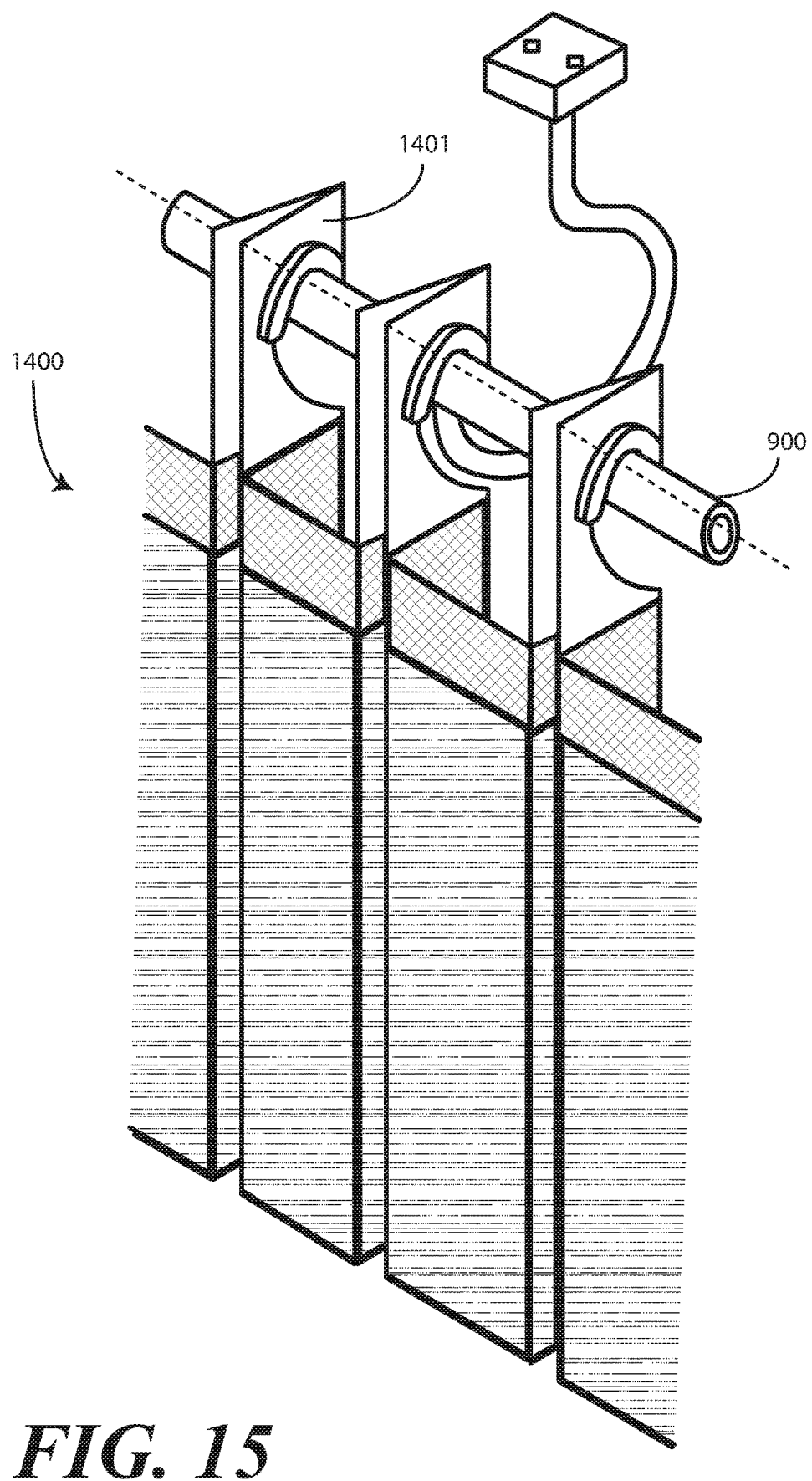
FIG. 15 illustrates one explanatory hanging system in accordance with one or more embodiments of the disclosure.

As shown in FIGS. 11-13, a system comprises a hanging apparatus 1100. In this illustrative embodiment, the hanging apparatus 1100 comprises a hanger 100 and a hanging item extending distally from the hanger 100 (the hanging apparatus is not shown in FIGS. 11-13 for clarity, but one example of which is shown in FIGS. 14-15). The hanger defines an aperture 102. As noted above, in one embodiment the aperture comprises a split rotated concave cardioid upper contour (104) bisected by an inverted convex cardioid (109) suspended into the aperture 102 and an intersecting concave lower contour (114) comprising a cusp (117). The aperture 102 is to fold along the inverted convex cardioid (109) to form a folded hanger. As shown in FIGS. 11-13, the track 900 fits within upper lobes 107,108 of the folded hanger defined by the split rotated concave cardioid upper contour (104) to hang from the track 900.

Turning now to FIG. 14, illustrated therein is one hanging item 1400 comprising a hanger 1401 that defines a plurality of apertures 1402,1403,1404,1405,1406,1407,1408,1409 in accordance with one or more embodiments of the disclosure. The hanging item 1400 of FIG. 14 is a curtain. However, it will be obvious to those of ordinary skill in the art having the benefit of this disclosure that the hanging item 1400 can take other forms as well, including artwork, plants, animal or insect netting, waterproofing material, and so forth.

The hanger 1401 of this embodiment is a strip of woven mesh into which the apertures 1402,1403,1404,1405,1406, 1407,1408,1409 are cut with a hot knife or hot die. The curtain of this illustrative embodiment extends distally from a cusp side 1410 of the hanger 1401. This curtain comprises a porous mesh section 1411 and an opaque section 1412. The porous mesh section 1411 is disposed between the hanger 1401 and the opaque section 1412 in this embodiment. Such curtains are well suited for hospital and other medical environments because they allow air circulation through the porous mesh section 1411, while providing privacy and sound dampening at the opaque section 1412.

While this illustrative embodiment includes the porous mesh section 1411 and the opaque section 1412, it will be obvious to those of ordinary skill in the art having the benefit of this disclosure that the hanging item 1400 could be configured in other ways as well. For example, in another embodiment the hanging item 1400 is completely opaque, while in yet another embodiment the hanging item 1400 is complete porous mesh. In another embodiment, selective portions of the hanging item 1400 can be opaque, while other portions are porous mesh. In still other embodiments, one or both of the porous mesh or the opaque material can be substituted with transparent materials. These are examples of various hanging item configurations only.

In the illustrative embodiment, each aperture 1402,1403, 1404,1405,1406,1407,1408,1409 us separated between two and twenty inches. For example, in one embodiment each aperture 1402,1403,1404,1405,1406,1407,1408,1409 is separated between ten and fifteen inches. In one embodiment, each aperture 1402,1403,1404,1405,1406,1407,1408, 1409 is separated about twelve and a half inches. In this illustrative embodiment, the porous mesh section 1411 has a length 1413 of between eighteen and twenty-two inches. For example, in one embodiment, the porous mesh section extends about nineteen inches in length 1413 beneath the hanger 1401. The length 1414 of the opaque section 1412 can be determined by the environment in which the hanging item 1400 is to be placed. In one embodiment, the length 1414 of the opaque section 1412 is a function of track separation from a ceiling and total ceiling height.

As with previous embodiments, each aperture 1402,1403, 1404,1405,1406,1407,1408,1409 is foldable along its vertical centerline to form a folded hanger. Once folded, the hanging item 1400 can be attached to a track by placing an open side of each aperture 1402,1403,1404,1405,1406,1407, 1408,1409 over the track to seat the track within the lobes defined by the split rotated concave cardioid upper contours. Turning now to FIG. 15, illustrated therein is such a system.

As shown in FIG. 15, each aperture (1402,1403,1404, 1405,1406,1407,1408,1409) has been folded so that an open side of the track receiver formed by folding each aperture (1402,1403,1404,1405,1406,1407,1408,1409) can be placed on a track 900. The hanging item 1400 can quickly and easily be mounted or dismounted from the track 900 by simply lifting the hanging item 1400 off the track or setting it thereon. Additionally, by folding the hanging item in an accordion fold, the hanging item can be compressed such that each aperture (1402,1403,1404,1405,1406,1407,1408, 1409) of the hanger 1401 touches the next adjacent aperture (1402,1403,1404,1405,1406,1407,1408,1409) so that the hanging item can easily be lifted and moved by a single user employing only their hands.

The system of FIG. 15 allows the hanging item 1400 to be quickly and simply mounted to, or dismounted from, the track 900. Moreover, as previously described, the track 900 itself is easy to mount and configure as desired. The system allows for smooth and quiet movement of the hanging item 1400. Additionally, the system is very aesthetically pleasing as well.

Figure 22:
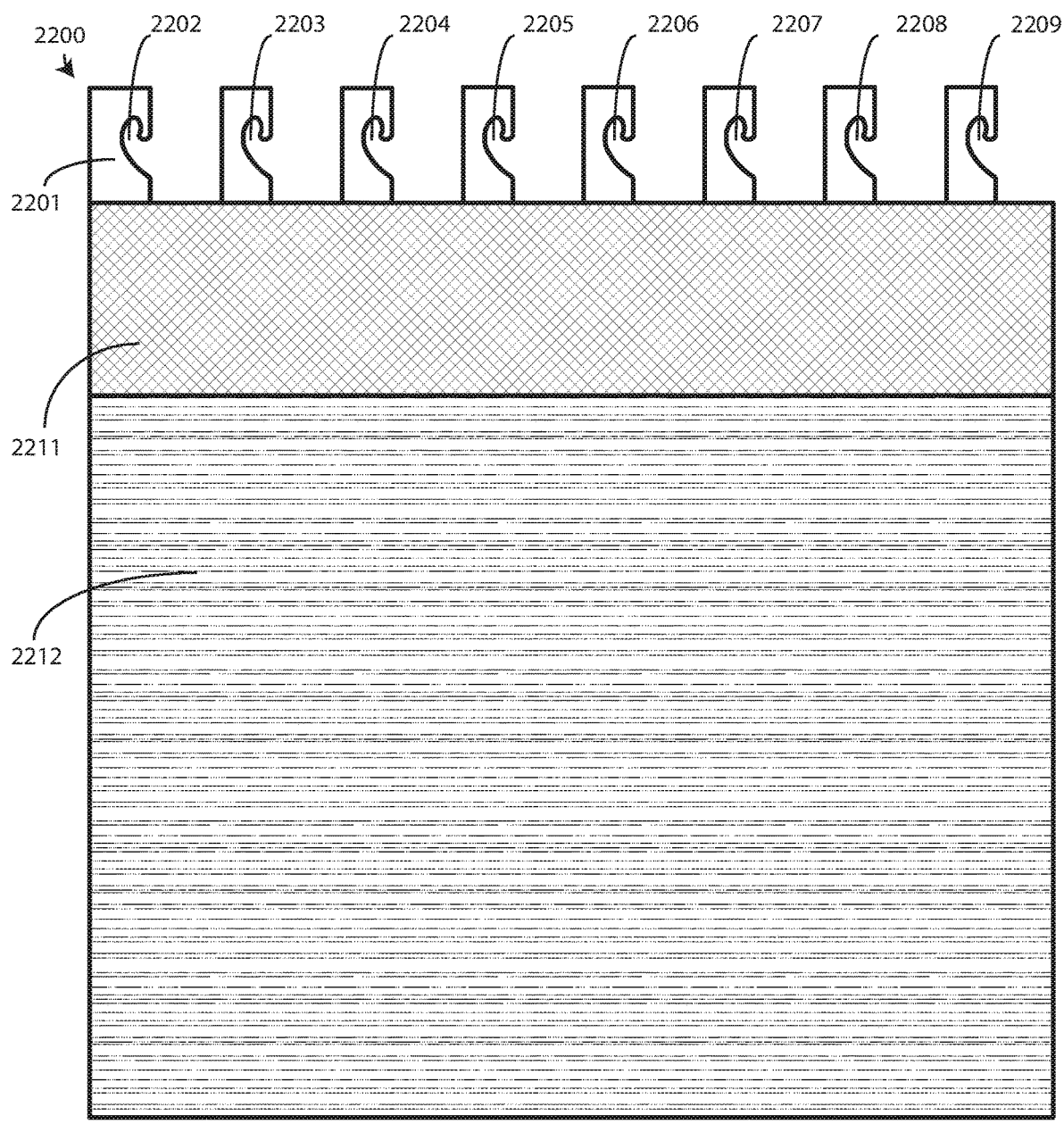
FIG. 22 illustrates one explanatory hanging item comprising a hanger that is segmented in accordance with one or more embodiments of the disclosure.
Figure 23:
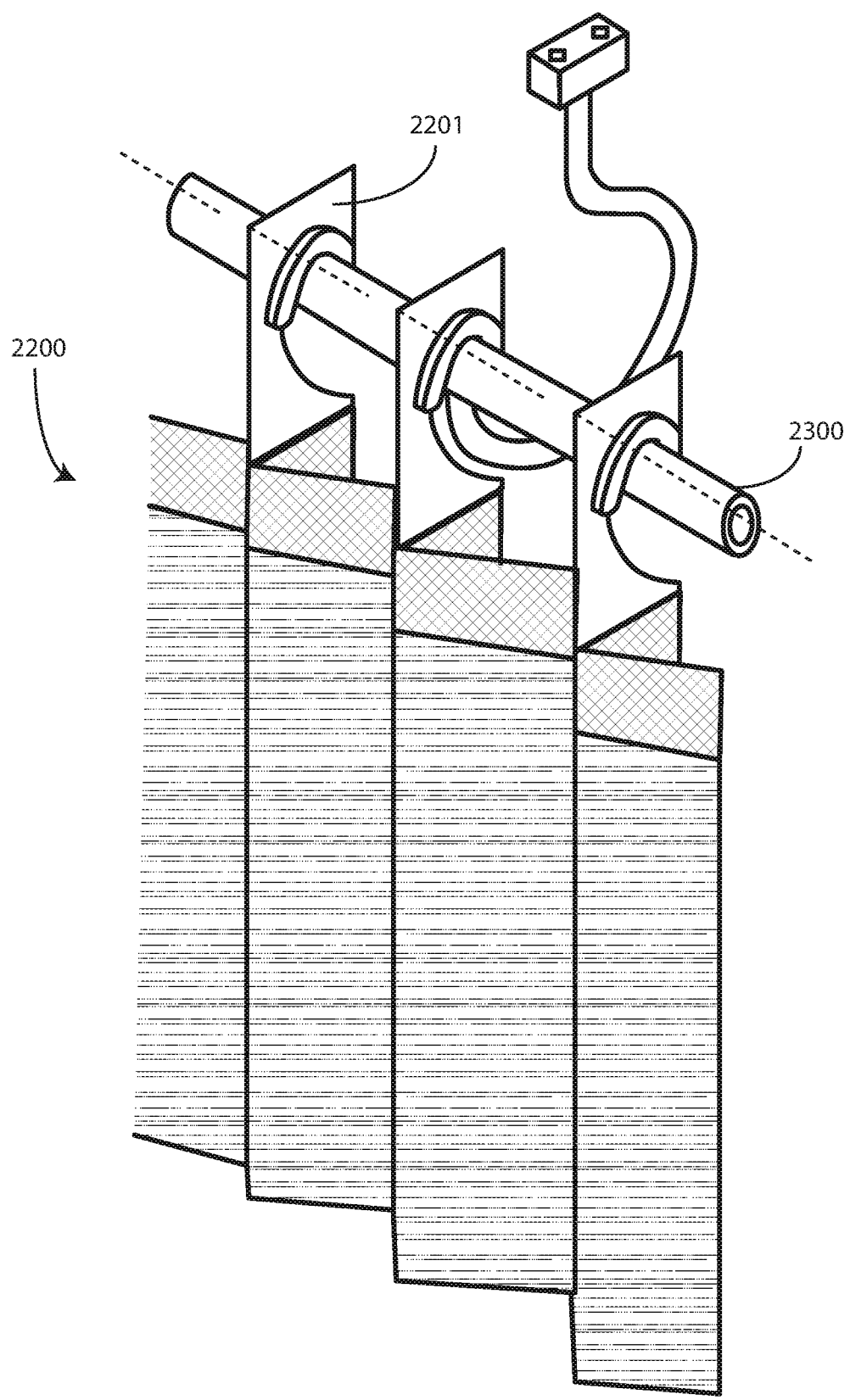
FIG. 23 illustrates an application for one explanatory hanging item in accordance with one or more embodiments of the disclosure.

To this point, the hanging item 1400 has been described as including woven mesh that is folded to form the split rotated concave cardioid upper contour. However, in one or more embodiments, the split rotated concave cardioid upper contour can be formed without folding when the aperture is open, i.e., such that each aperture (1402,1403,1404,1405, 1406,1407,1408,1409) of the hanger 1401 is cut in half and the woven mesh is segmented. Such an embodiment is shown in FIGS. 22-23. Turning briefly to these figures, this embodiment will be briefly described.

Beginning with FIG. 22, illustrated therein is one hanging item 2200 comprising a hanger 2201 that is segmented. Each segment defines a plurality of open apertures 2202,223, 2204,2205,2206,2207,2208,2209 in accordance with one or more embodiments of the disclosure. The hanging item 2200 of FIG. 22 is a curtain. However, it will be obvious to those of ordinary skill in the art having the benefit of this disclosure that the hanging item 2200 can take other forms as well, including artwork, plants, animal or insect netting, waterproofing material, and so forth.

The hanger 2201 of this embodiment is a plurality of segments of woven mesh into which the apertures 2202, 2203,2204,2205,2206,2207,2208,2209 are cut with a hot knife or hot die. The apertures 2202,2203,2204,2205,2206, 2207,2208,2209 are open along one side of each segment, i.e., the right side of each segment in FIG. 22, while the other side, i.e., the left side of each segment in FIG. 22, does not intersect the aperture. This curtain comprises a porous mesh section 2211 and an opaque section 2212. The porous mesh section 2211 is disposed between the hanger 2201 and the opaque section 2212 in this embodiment.

In the illustrative embodiment, each aperture 2202,2203, 2204,2205,2206,2207,2208,2209 us separated between two and twenty inches. For example, in one embodiment each aperture 2202,2203,2204,2205,2206,2207,2208,2209 is separated between ten and fifteen inches. In one embodiment, each aperture 2202,2203,2204,2205,2206,2207,2208, 2209 is separated about twelve and a half inches In contrast to previous embodiments, each aperture 2202, 2203,2204,2205,2206,2207,2208,2209 need not be folded due to the fact that an entry into each aperture is available along one side of each hanger segment. Accordingly, without any folding, the hanging item 2200 can be attached to a track by placing an open side of each aperture 2202,2203, 2204,2205,2206,2207,2208,2209 over the track to seat the track within the lobes defined by the split rotated concave cardioid upper contours. Turning now to FIG. 23, illustrated therein is such a system.

As shown in FIG. 23, the open side of each aperture (2202,2203,2204,2205,2206,2207,2208,2209) has been placed on a track 2300. The hanging item 2200 can quickly and easily be mounted or dismounted from the track 2300 by simply lifting the hanging item 2200 off the track or setting it thereon. Additionally, by folding the hanging item 2200 in an accordion fold, the hanging item can be compressed such that each aperture (2202,2203,2204,2205,2206,2207,2208, 2209) of the hanger 2201 touches the next adjacent aperture (2202,2203,2204,2205,2206,2207,2208,2209) so that the hanging item can easily be lifted and moved by a single user employing only their hands.

Turning now to FIGS. 16-19, illustrated therein are various hanging apparatuses configured in accordance with one or more embodiments of the disclosure. Beginning with FIG. 16, the hanging apparatus 1600 comprises a track hanger 1601 that includes a base 1602, an extension 1603, and a hook 1604. A track 1605 is integrally formed with the hook 1604 and has a rectangular cross section. While integrating the track 1605 with the hook 1604 is one possible configuration, in other embodiments the track 1605 can be separable from the hook 1604 as previously described. Additionally, rather than having a rectangular cross section, the track 1605 can have a triangular or polygonal cross section as well.

Figure 17:
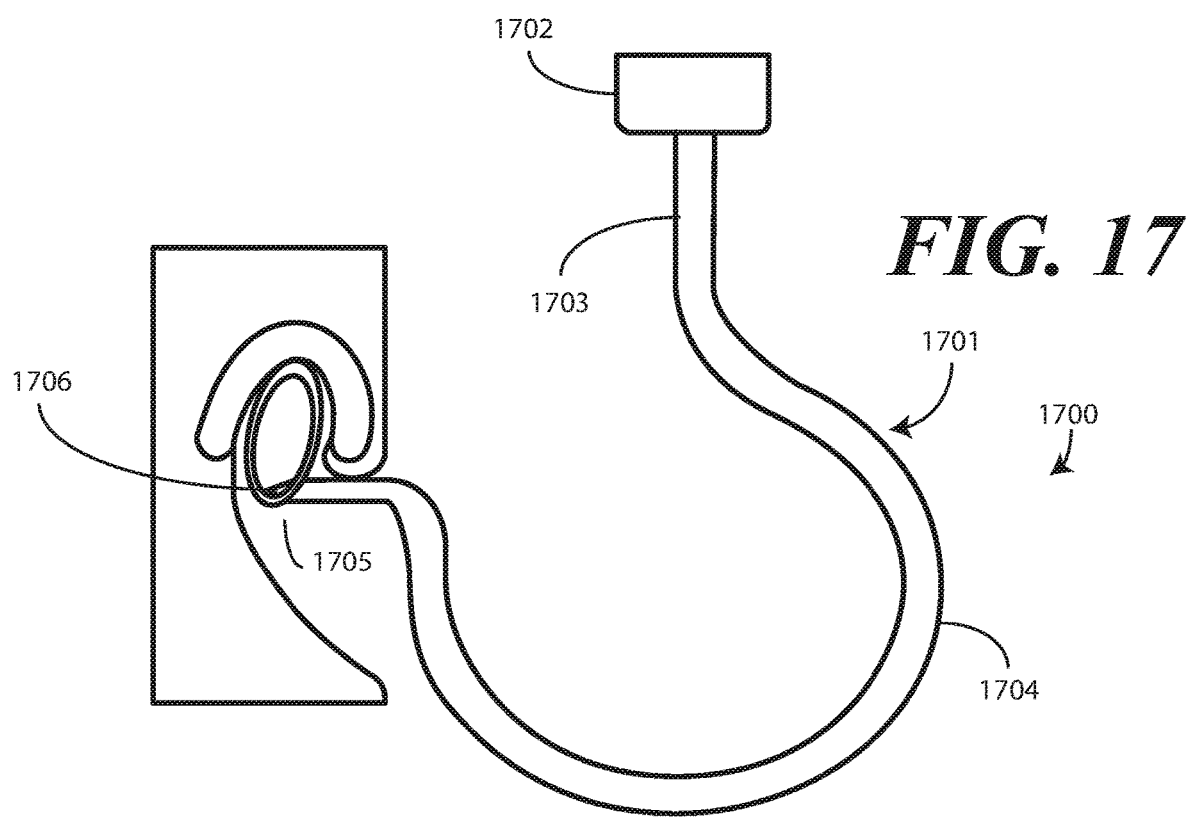
FIG. 17 illustrates an alternate hanging system in accordance with one or more embodiments of the disclosure.

Turning to FIG. 17, the hanging apparatus 1700 comprises a track hanger 1701 that includes a base 1702, an extension 1703, and a hook 1704. The hook connects into the side of a track 1705 having an ovular cross section. The track 1705 of FIG. 17 does not include apertures as did the track (900) of FIG. 9. Instead, the track 1705 is soft enough that the tip 1706 of the track hanger 1701 penetrates the side of the track 1705 to attach the track 1705 to the track hanger 1701. Additionally, in this illustrative embodiment, the track 1705 is oriented such that the major axis of the ovular cross section is non-vertical.

Turning now to FIGS. 18 and 19, illustrated therein is another hanging apparatus 1900. FIG. 18 illustrates an exploded view, while FIG. 19 illustrates an assembled view. The hanging apparatus 1900 comprises a track hanger 1901 that includes a base 1902, an extension 1903, and a hook 1904. The hook 1904 terminates in a barbed hook 1907 that facilitates one-way penetration of the barbed hook 1907 into the track 1905. Additionally, the track 1905 of this embodiment includes an inward slot 1908 into which the barbed hook 1907 is inserted.

Figure 20:
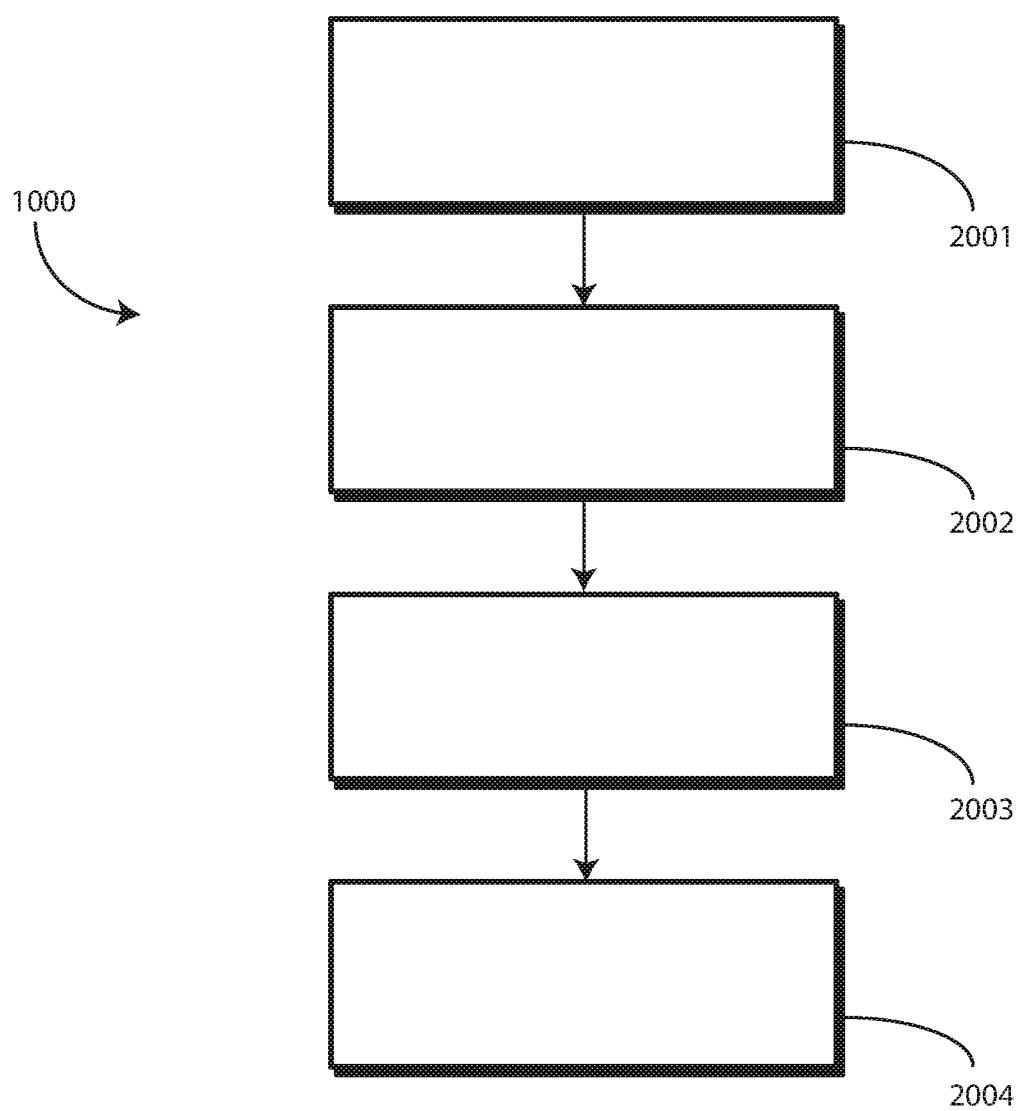
FIG. 20 illustrates an explanatory method in accordance with one or more embodiments of the disclosure.

Turning now to FIG. 20, illustrated therein is a method 2000 in accordance with one or more embodiments of the disclosure. The method 2000 can be used to manufacture one or more hangable systems configured in accordance with embodiments of the disclosure, as well as to mount a hanging item in accordance with one or more embodiments. Additionally, select steps of the method 2000 can be executed in reverse order to dismount the hanging item as well.

Beginning at step 2001, a hanger is provided for an item. At step 2001, the hanger is provided by placing apertures in the hanger. In one embodiment, each aperture comprises a split rotated concave upper cardioid contour bisected by an inverted convex cardioid extending into the aperture between portions of the split rotated concave cardioid contour.

At step 2002, an item attached to the hanger of step 2001 is provided. In one embodiment, the item extends distally from the hanger. Examples of items include curtains, dividers, artwork, plant baskets, and so forth.

At step 2003, each aperture is folded along a fold lien bisecting each aperture. The folding transforms each aperture into a track receiver. At step 2004, the item is mounted on a track by placing the track into one or more lobes formed by the split rotated concave upper cardioid contour. Step 2004 can be reversed to dismount the item from the track.

Figure 21:
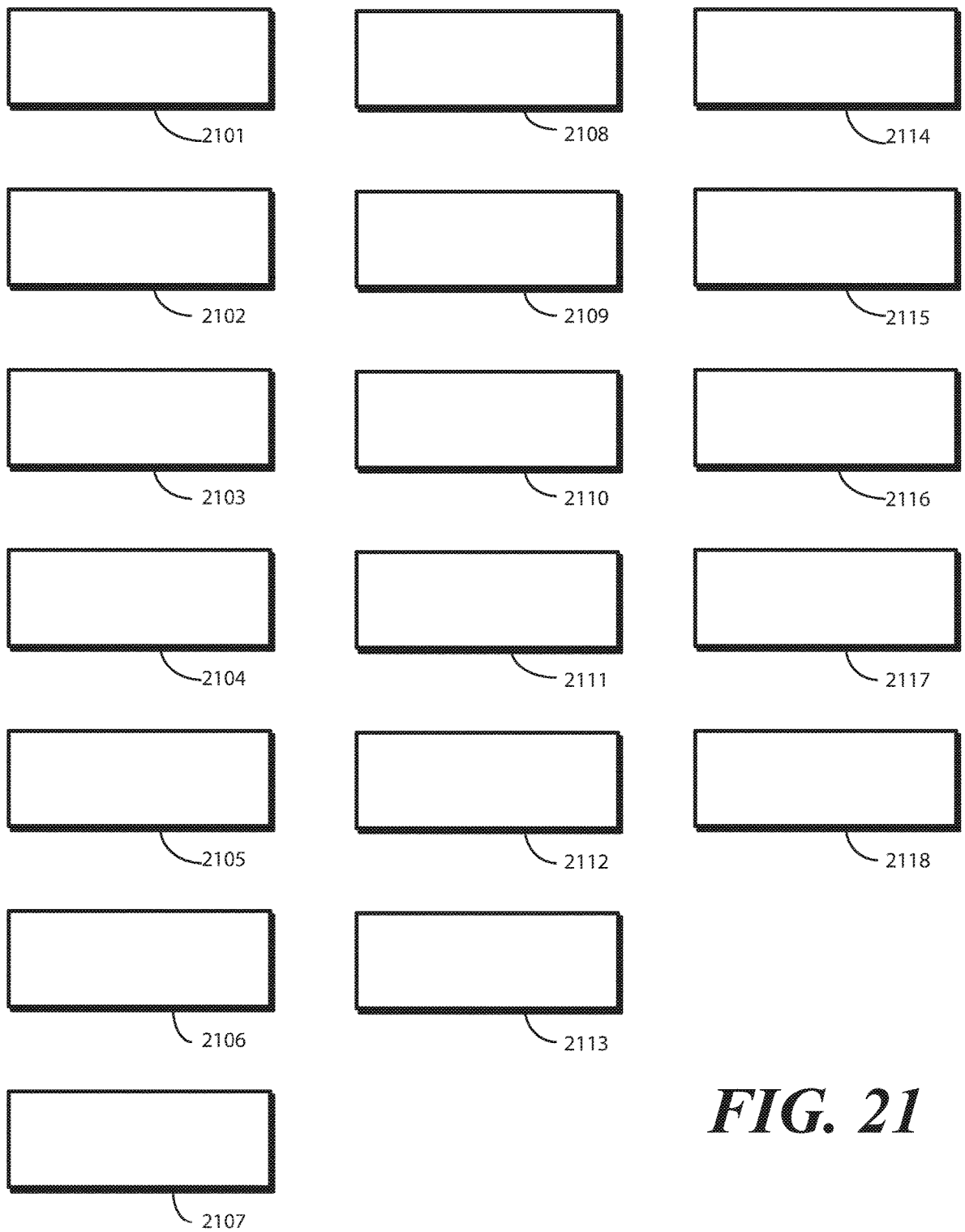
FIG. 21 illustrates various embodiments of the disclosure.

Turning now to FIG. 21, illustrated therein are various embodiments of the disclosure. 1. At 2101, an apparatus comprises a hanger for an item. At 2101 the hanger defines an aperture. At 2101, the aperture comprises a split rotated concave cardioid upper contour. At 2101, the split rotated concave cardioid upper contour comprises a first portion and a second portion. At 2101, the first portion and the second portion are separated by an inverted convex cardioid. At 2101, the inverted convex cardioid is suspended into the aperture by two concave sidewalls. At 2101, the aperture also includes an intersecting concave lower contour. At 2101, the intersecting concave lower contour comprises a cusp.

At 2102, the hanger of 2101 is to fold along a fold line running from a center of the inverted convex cardioid to the cusp. At 2103, the apparatus of 2101 further comprises stitching disposed along a perimeter of the aperture. At 2104, the apparatus of 2012 further comprises a rigid reinforcing device disposed about at least a portion of the split rotated concave cardioid upper contour.

At 2105, the item hanging from the hanger comprises a curtain extending distally from a cusp side of the hanger. At 2106, the curtain of 2105 comprises a porous mesh section. At 2106, the curtain of 2105 comprises an opaque section. At 2106, the porous mesh section is disposed between the hanger and the opaque section. At 2107, the porous mesh section of 2106 extends between eighteen and twenty-two inches beneath the hanger.

At 2108, the hanger of 2101 defines a plurality of the apertures. At 2109, each aperture of 2108 is separated between ten and fifteen inches. At 2109, the split rotated concave cardioid upper contour of 2101 defines two upper lobes. At 2110, each upper lobe comprises a contour complementary to the other lobe.

At 2111, the hanger of 2101 is manufactured from a woven mesh. At 2112, the woven mesh of 2111 is synthetic. At 2113, the woven mesh of 2111 is launderable. At 2114, the woven mesh of 2111 is three inches wide.

At 2115, a system comprises a hanging apparatus. At 2115, the hanging apparatus comprises a hanger and a hanging item extending distally from the hanger. At 2115, the hanger of 2101 defines a plurality of apertures. At 2115, each aperture comprises a split rotated concave cardioid upper contour bisected by an inverted convex cardioid suspended into the aperture. At 2115, each aperture comprises a lower contour comprising a cusp. At 2115, the system also comprises a track. At 2115, the apertures to fold along the inverted convex cardioid to form a folded hanger. At 2115, the track is to fit within upper lobes of the folded hanger defined by the split rotated concave cardioid upper contour. At 2116, the track of 2115 is flexible. At 2117, the track of 2116 is plastic. At 2118, the system of 2118 further comprises a track hanger to suspend the track from a surface.

Figure 24:
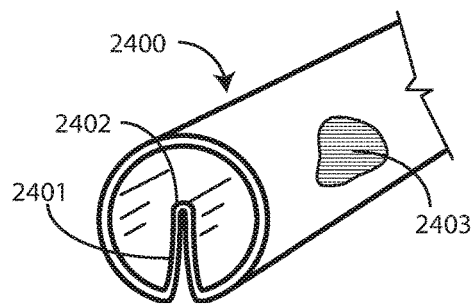
FIG. 24 illustrates one explanatory track system in accordance with one or more embodiments of the disclosure.

Turning now to FIG. 24, illustrated therein is one explanatory track 2400 system in accordance with one or more embodiments of the disclosure. As with the embodiment of FIG. 9, in one embodiment the track 2400 of FIG. 24 comprises a tube that is generally round in cross section with a peninsular indentation 2401 that terminates at a friction pinch 2402 where each side of the peninsular indentation 2401 comes close enough together that an object inserted into the peninsular indentation 2401 will be frictionally retained within the track 2400.

In one embodiment, the track 2400 is flexible so that it can be shaped into different contours so as to be attachable to various types of track hangers, some of which will be described in FIGS. 25-28 below. For example, in one embodiment the track 2400 is manufactured from plastic. One suitable plastic for the track 2400 is polyethylene, although other flexible materials will be obvious to those of ordinary skill in the art having the benefit of this disclosure. In one embodiment, the track 2400 is manufactured from an extrusion process.

In one embodiment, the track 2400 is a continuous piece. As will be described with reference to FIG. 41 below, in other embodiments track segments can be aligned with portions inserting into other portions to create an extendable track. In one embodiment, the track 2400 is malleable. While the cross section of the track 2400 shown in FIG. 24 is generally circular, it should be noted that the cross section could take other shapes as well, such as ovular or flat.

As with the track (900) of FIG. 9, in one embodiment the track 2400 is easily cleaned. It can be light beige in color. It can be cut to predefined lengths, such as twenty-foot lengths. It can comprise a coating 2403. In one embodiment the track 2400 is coated with a silicon-based coating to allow hangers configured in accordance with one or more embodiments to more smoothly slide along the track 2400, thereby providing a very, very quiet system when hangers slide along the track 2400 in operation.

Figure 25:
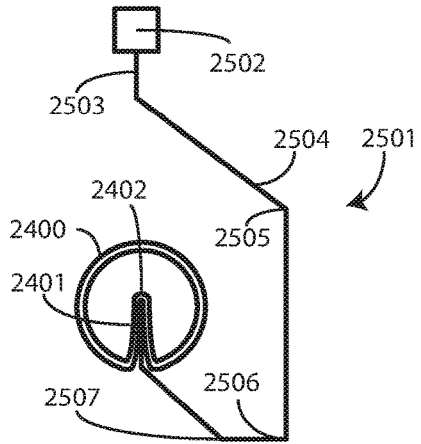
FIG. 25 illustrates one explanatory hanging system in accordance with one or more embodiments of the disclosure.

Turning now to FIG. 25, illustrated therein is the track 2400 of FIG. 24 attached to one explanatory track hanger 2501. In this illustrative embodiment, the track hanger 2501 includes a base 2502, an extension 2503, and a hook 2504 having one or more bends 2505,2506,2507. In this embodiment, the extension 2503 and hook 2504 can be manufactured from either metal or plastic. In one embodiment, the track hanger 2501 is manufactured from plastic with the base 2502 integrally formed with the hook 2504. In another embodiment, the extension 2503 and hook 2504 are manufactured from metal and are insert molded into the base 2502. In another embodiment, each of the base 2502, the extension 2503, and the hook 2504 are manufactured from a unitary piece of metal. Here, the base 2502 has a rectangular cross section. Rather than having a rectangular cross section, the base 2502 can have a triangular, round, or polygonal cross section as well.

In this illustrative embodiment, the hook 2504 includes three bends 2505,2506,2057. Bends 2505 and 2507 are obtuse, while bend 2506 is substantially orthogonal. The tip of the hook 2504 opposite the base 2502 is inserted into the peninsular indentation 2401 of the track 2400. Here, the tip is inserted until it reaches the friction pinch 2402 where each side of the peninsular indentation 2401 comes close enough together that the tip will be frictionally retained within the track 2400.

Figure 26:
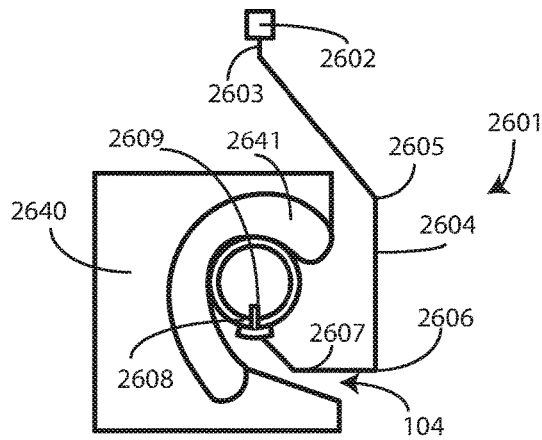
FIG. 26 illustrates one explanatory hanging system in accordance with one or more embodiments of the disclosure.

Turning now to FIG. 26, illustrated therein is an alternate hanging system. The hanger 2601 and track 2620 of FIG. 26 are largely like the ones shown in FIG. 25. For example, the hanger 2601 includes a base 2602, an extension 2603, and a hook 2604 having one or more bends 2605,2606,2607. Bends 2605 and 2607 are obtuse, while bend 2606 is substantially orthogonal.

Similarly, the track 2620 comprises a tube that is generally round in cross section. The track 2620 is flexible so that it can be shaped into different contours so as to be attachable to various types of track hangers. The track 22620 is a continuous piece.

Rather than having a peninsular indentation (2401) that terminates at a friction pinch (2402) where each side of the peninsular indentation (2401) comes close enough together that an object inserted into the peninsular indentation (2401) will be frictionally retained within the track, here the track 2620 defines one or more apertures 2608 that are disposed along the track 2620. The hanger 2601 of FIG. 26 differs from that of FIG. 25 in that the tip of the hook 2604 opposite the base 2602 defines a T-shaped key 2609 where the base of the T-shaped key 2609 is inserted the aperture 2608. Here, the tip is inserted until the top of the T-shaped key 2609, which is inverted in FIG. 26, reaches the outer surface of the track 2620. Where the track 2620 is made from a thermoplastic material, friction will retain the T-shaped key 2609 within the aperture 2608.

A hanger 2640, to which an optional rigid reinforcing device 2641 is attached, is then hung on the track 2620. In the illustrative embodiment of FIG. 26, the optional rigid reinforcing device 2641 is disposed about at least a portion of the split rotated concave cardioid upper contour 104. In this embodiment, the optional rigid reinforcing device 2641 comprises a plastic device that is stitched, adhesively attached, or otherwise bonded to the hanger 2640. While an optional rigid reinforcing device 2641 is used in FIG. 26, other reinforcing devices will be obvious to those of ordinary skill in the art having the benefit of this disclosure as noted above.

Note that the hanger 2640 could be a curtain itself. For example, the section of the hanger 2640 coupled to the optional rigid reinforcing device 2641 could simply be the material comprising a curtain. It need not be an additional fabric material.

Figure 27:
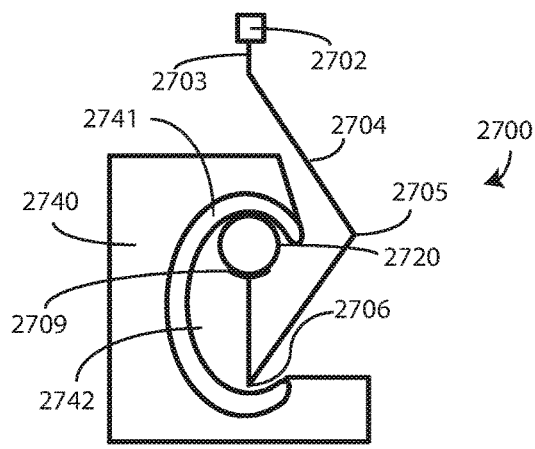
FIG. 27 illustrates one explanatory hanging system in accordance with one or more embodiments of the disclosure.

Turning now to FIG. 27, illustrated therein is an alternate hanging system. The hanger 2701 and track 2720 of FIG. 27 are somewhat similar to the ones shown in FIGS. 25 and 26. For example, the hanger 2701 includes a base 2702, an extension 2703, and a hook 2704. Similarly, the track 2720 comprises a tube that is generally round in cross section. The track 2720 is flexible so that it can be shaped into different contours so as to be attachable to various types of track hangers.

Rather than having three bends (2605,2606,2607), as was the case in FIG. 26 for example, the hook 2704 of FIG. 27 includes only two bends 2705,2706. Bend 2705 is substantially orthogonal or obtuse, while bend 2706 is acute.

Also, rather than having a peninsular indentation (2401) that terminates at a friction pinch (2402), and rather than having one or more apertures (2608), the track 2720 of FIG. 27 is round. Rather than having T-shaped key (2609), the tip of the hook 2704 in FIG. 27 includes a partially circular receiver 2709. The track 2720 can be adhesively or otherwise adhered to the partially circular receiver 2709. Where the track 2720 is heavy enough, gravity can seat the track 2720 within the partially circular receiver 2709. In still other embodiments, magnets can be used to couple the track 2720 to the partially circular receiver 2709. Other techniques for attaching the track 2720 to the partially circular receiver 2709 will be obvious to those of ordinary skill in the art having the benefit of this disclosure. A hanger 2740, which includes a reinforcing device 2741, is then hung on the track 2720. Here, the reinforcing device 2741 is largely C-shaped and is disposed about at least a portion of a split rotated marginally concave cardioid upper contour 2742.

Figure 28:
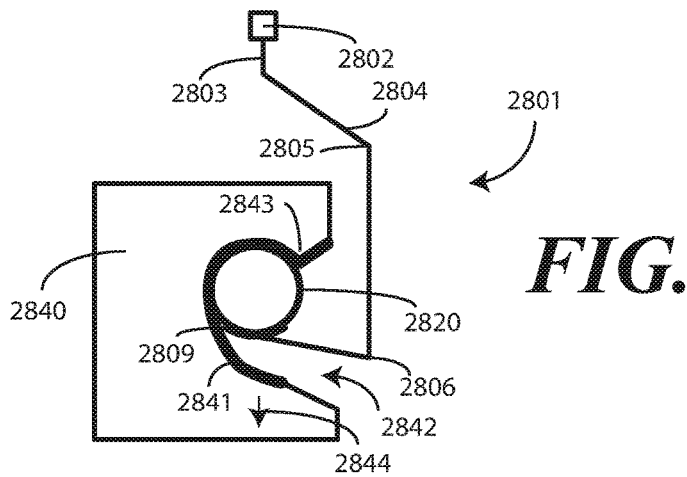
FIG. 28 illustrates one explanatory hanging system in accordance with one or more embodiments of the disclosure.

Turning now to FIG. 28, illustrated therein is an alternate hanging system. The hanger 2801 and track 2820 of FIG. 28 are somewhat similar to the one shown in FIG. 28. For example, the hanger 2801 includes a base 2802, an extension 2803, and a hook 2804. The hook 2804 of FIG. 28 also includes only two bends 2805,2806. However, in contrast to the embodiment of FIG. 27, in FIG. 28 bend 2805 is obtuse while bend 2806 is acute.

The hanger 2801 also has a tip that terminates at a partially circular receiver 2809. As with FIG. 27, the track 2820 can be adhesively or otherwise adhered to the partially circular receiver 2809.

A hanger 2840, which includes a reinforcing device 2841, is then hung on the track 2820. Here, the reinforcing device 2841 is largely C-shaped and is disposed about at least a portion of a split rotated marginally concave cardioid upper contour 2842. The reinforcing device 2841 differs from previous embodiments in that it includes a downwardly facing bend 2843 that retains the center of gravity 2844 of the hanger 2840 between the left and right sides of the track 2820. As with previous embodiments, the reinforcing device 2841 can be manufactured from plastic, resins, stitching, adhesively attached objects, or otherwise bonded objects.

Turning now to FIG. 29, illustrated therein is an alternate hanging item 2900 in accordance with one or more embodiments of the disclosure. Only a portion of the hanging item 2900 is shown in FIG. 29 for convenience. The section could be repeated to the right and left of the illustrated section, as indicated by the ellipsis. The hanging item 2900 of FIG. 29 is a curtain. However, it will be obvious to those of ordinary skill in the art having the benefit of this disclosure that the hanging item 2900 can take other forms as well, including artwork, plants, animal or insect netting, waterproofing material, and so forth. While shown as a solid item in FIG. 29, the curtain could include various layers, such as the porous mesh section (2211) and opaque section (2212) shown in FIG. 22. Other portions could be included, as will be obvious to those of ordinary skill in the art having the benefit of this disclosure.

The hanging item 2900 of FIG. 29 includes an integrated hanger 2901 that comprises oppositely facing, separated C-shaped open apertures 2902,2903. The oppositely facing, separated C-shaped open apertures 2902,2903 are separated by an extension bridge 2904 in one embodiment. In one embodiment, the oppositely facing, separated C-shaped open apertures 2902,2903 are cut, sewn, or otherwise integrated into the hanging item 2900. In this illustrative embodiment, the oppositely facing, separated C-shaped open apertures 2902,2903 are open in oppositely facing directions. For example, separated C-shaped open aperture 2902 is open along one side, i.e., the right side in FIG. 29, while the other separated C-shaped open aperture 2903 is open along an opposite side, i.e., the left side in FIG. 29.

In one embodiment, the extension bridge 2904 separates the oppositely facing, separated C-shaped open apertures 2902,2903 by a distance of between two and twenty inches. For example, in one embodiment the oppositely facing, separated C-shaped open apertures 2902,2903 are separated between five and ten inches. In another embodiment, the oppositely facing, separated C-shaped open apertures 2902, 2903 are separated between ten and fifteen inches. In one embodiment, each oppositely facing, separated C-shaped open aperture 2902,2903 is separated about twelve and a half inches In this illustrative embodiment, each oppositely facing, separated C-shaped open apertures 2902,2903 is bounded above by a reinforcing device 2905,2906. In the illustrative embodiment of FIG. 29, the reinforcing devices 2905,2096 are disposed above at least a portion of each oppositely facing, separated C-shaped open aperture. 2902,2903. In one embodiment, each reinforcing device 2905,2906 is rigid and comprises a plastic device that is stitched, adhesively attached, or otherwise bonded to the hanging item 2900.

Rather than folding a hanger attached to the hanging item 2900, to use the hanging item 2900 of FIG. 29, one folds the extension bridge 2904, thereby causing the oppositely facing, separated C-shaped open apertures 2902,2903 to face in a common direction. This is similar to causing the hanger (100) of FIG. 3 to fold to open the aperture 102. Folding the extension bridge 2904 causes the open side of each oppositely facing, separated C-shaped open aperture 2902,2903 to instead face in a common direction to transform the oppositely facing, separated C-shaped open apertures 2902, 2903 into a track receiver comprising an open side facing the fold line and a closed side formed by the outer contour of the oppositely facing, separated C-shaped open apertures 2902, 2903. The hanging item 2900 can then be quickly and easily mounted on a track by placing the track receiver about a track such that the track seats within lobes defined by each oppositely facing, separated C-shaped open aperture 2902, 2903. The hanging assembly 3300 is shown in FIG. 33. It should be noted that the brackets 3301 of FIG. 31 could have different extension lengths to extend from a wall or ceiling different amounts based upon the contours of the room.

Turning now to FIG. 30, illustrated therein is an end wall mount bracket 3000 in accordance with one or more embodiments of the disclosure. Embodiments of the disclosure contemplate that some applications will prefer to have the ends of a track, e.g., the track (2400) of FIGS. 24-25, the track (2620) of FIG. 26, the track (2720) of FIG. 27, or the track (2820) of FIG. 28 attached to something at the end. Accordingly, in one embodiment the end wall mount bracket 3000 can be attached to a wall with screws 3002,3003,3004 or other fasteners that are inserted in corners of the end wall mount bracket 3000 to attach its base member 3001 to a wall or other flat surface. A screw 3005 can then be placed through a mounter 3006 and screwed through the extruded plastic tubing defining a track such as track (2400) of FIGS. 24-25, the track (2620) of FIG. 26, the track (2720) of FIG. 27, or the track (2820) of FIG. 28. The end wall mount bracket 3000 of FIG. 30 is but one way of securing the end of a track in accordance with one or more embodiments of the disclosure. Other devices for securing the ends of a track will be obvious to those of ordinary skill in the art having the benefit of this disclosure.

Turning now to FIG. 32, illustrated therein is another explanatory track hanger 3100 configured in accordance with one or more embodiments. In one embodiment, the track hanger 3100 is to suspend a track from a surface such as a wall or ceiling. This illustrative track hanger 3100 includes a hook 3101 and an extension 3102. A base member similar to the base member (503) of FIG. 5 can be attached to the extension 3102. The base member can optionally include one or more apertures through which screws or other fasteners may be inserted to attach the base member to a ceiling or other flat surface from which something is to be hung.

In one embodiment, the track hanger 3100 is a unitary element, with each of the hook, extension 3102, and base member (not shown) being formed as a single, integral unit. For example, in one embodiment the track hanger 3100 is manufactured from a thermoplastic material by way of an injection molding process. The track hanger 3100 can be manufactured from nylon, styrene, ABS, polycarbonate, or polycarbonate-ABS, PMMA, PVC, or other polyamide-based thermoplastics in one embodiment. The extension 3102 can be of varying lengths so as to lower the track from a ceiling or other surface.

In this illustrative embodiment, the hook 3101 includes a track seat 3103, which is defined by a concave recess disposed along the top of the hook 3101. In one embodiment, the track seat 3103 includes a centrally-disposed barbed hook 3104 that facilitates one-way penetration of the barbed hook 3104 into a track as was described above with reference to FIGS. 18-19. Additionally, support barbs 3105, 3106 can be included on the sides of the track seat 3103 for additional stability.

Turning now to FIG. 32, illustrated therein is another explanatory track hanger 3200 configured in accordance with one or more embodiments to suspend a track from a surface such as a wall or ceiling. This illustrative track hanger 3200 is similar to the track hanger (3100) of FIG. 31, as it includes a hook 3201 and an extension 3202. A base member similar to the base member (503) of FIG. 5 can be attached to the extension 3202.

In this illustrative embodiment, the hook 3201 includes a half track seat 3203, which is formed when an intersection 3205 between the hook 3201 and the extension 3202 is "beefed up" with additional material for strength. In one embodiment, the half track seat 3203 extends distally from the extension 3202 to terminate at a barbed hook 3204. The barbed hook 3204 allows one-way penetration into a track as previously described.

Turning now to FIG. 34, illustrated therein is the track 2400 of FIG. 24 attached to one or more track hangers 3401,3402. Here, the track hangers 3401,3402 are coupled to a ceiling using screws or other fasteners. The track 2400 is then attached thereto to form a mounting system. After the mounting system is shaped as desired, one or more hangers having items hanging therefrom can be mounted on the track 2400.

Turning now to FIG. 35, illustrated therein are a plurality of hangers 100 nestled side by side. A snag preventer cap 3501, which can be a wire, plastic form, or other object, then bunches and bonds the various hangers together.

Turning now to FIG. 36, illustrated therein is yet another hanging system 3600 in accordance with one or more embodiments of the disclosure. As shown in FIG. 36, the hanging system 3600 includes one or more track hangers 3601 having a track 3602 attached thereto.

Once the track hangers 3601 are either placed into a mounting track (600), or mounted directly to a wall or ceiling using screws or other fasteners, the track 3602 can be attached thereto to form a mounting system. After the mounting system is shaped as desired, one or more hangers 3604,3605,3606 having hanging items 3607 hanging therefrom can be mounted on the track 3602. In one or more embodiments, the hanging item 3607 is detachable from the one or more hangers 3604,3605,3606 so that it can be washed. In other embodiments, the one or more hangers 3604,3605,3606 can be washed with the hanging item 3607.

Figure 39:
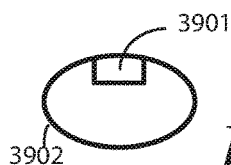
FIG. 39 illustrates a magnetized track system in accordance with one or more embodiments of the disclosure.

In this illustrative embodiment, the track 3602 includes strip magnets 3603 mounted in the upper portion of the track 3602. In one embodiment, the strip magnets 3603 can simply be adhesively or otherwise adhered to the track 3602. In other embodiments, the track 3602 can be magnetized in other ways. Turning briefly to FIG. 39, illustrated therein is a sectional view of another track 3902 with a magnetized portion 3901. In the embodiment of FIG. 39, the magnetized portion 3901 is manufactured by applying a liquid magnet coating to the track 3902. In another embodiment, the magnetized portion 3901 can be created by dipping the track 3902 within a magnetized liquid. Other techniques for created the strip magnets (3603) or the magnetized portion 3901 will be obvious to those of ordinary skill in the art having the benefit of this disclosure.

Turning now back to FIG. 36, in one embodiment the one or more hangers 3604,3605,3606 each comprise oppositely polarized magnets 3608,3609,3610. When the track 3602 includes strip magnets 3603, or alternatively some form of magnetized portion (3901), and the one or more hangers 3604,3605,3606 each comprise oppositely polarized magnets 3608,3609,3610, this causes the one or more hangers 3604,3605,3606 to elevate above the upper surface of the track 3602 to glide on air. Advantageously, such an embodiment offers quieter movement of the hanging item 3607 due to the use of oppositely polarized magnets. Further, mesh hangers do not break as do rigid plastic rings. Another advantage offered by this embodiment is the reduced labor cost associated with mounting and dismounting hanging items.

Figure 37:
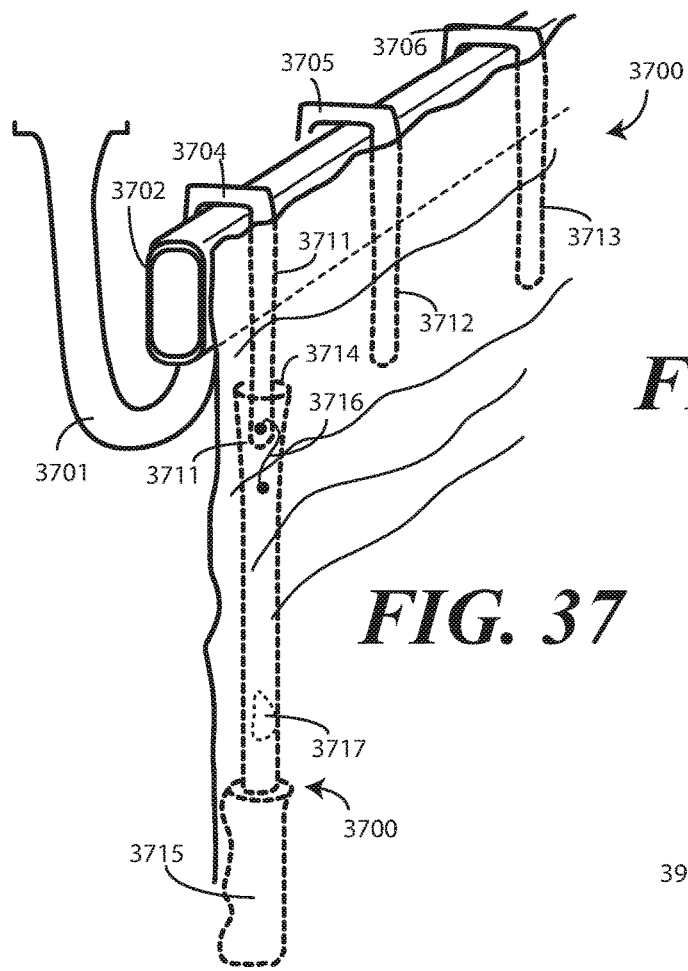
FIG. 37 illustrates one explanatory hanging system in accordance with one or more embodiments of the disclosure.

Embodiments of the disclosure contemplate that tools can assist a user in hanging or dismounting a particular item. Turning now to FIG. 37, illustrated therein is one such tool 3700.

As shown in FIG. 37, a hanging system includes one or more track hangers 3701 having a track 3702 attached thereto. Once the track hangers 3701 are either placed into a mounting track (600), or mounted directly to a wall or ceiling using screws or other fasteners, the track 3702 can be attached thereto to form a mounting system. After the mounting system is shaped as desired, one or more hangers 3704,3705,3706 having hanging items 3707 hanging therefrom can be mounted on the track 3602.

In one embodiment, the bottom tips 3711,3712,3713 of the one or more hangers 3704,3705,3706 are disconnected from the hanging item 3707. This allows a tool 3700, configured as a baton in this embodiment, having an open end 3714 distally disposed from a handle 3715 to receive a bottom tip 3711 to lift its corresponding hanger 3704 from the track 3702. In one or more embodiments, the tool 3700 can be tethered 3716 to a hanger 3704 so as to dangle from the hanger 3704 when not in use. In other embodiments, the tool 3700 can be separable from the one or more hangers 3704,3705,3706 so as to be usable with each hanger 3704, 3705,3706. Where the tool 3700 is tethered 3716 to the hanger 3704, in one or more embodiments it is detachable from the hanger 3704 so that the hanging item 3707 can be washed.

In one or more embodiments, the tool 3700 includes a coating 3717. For example, the coating 3717 can comprise one or more antimicrobial layers, treatments, or additives to enhance antimicrobial protection. Further, the coating 3717 can comprise charcoal or other odor absorbing materials can be integrated into the materials above to absorb odors. In other embodiments, the coating 3717 comprises an antibacterial, antimicrobial, or anti-odor material integrated therein to help reduce the risk of the tool 3700 serving as a vector for bacteria, microbes, or odors.

Figure 38:
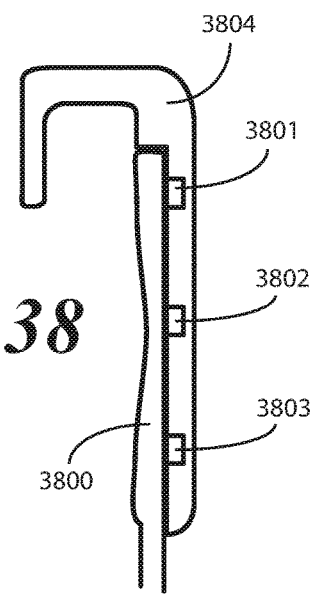
FIG. 38 illustrates one explanatory hanging item in accordance with one or more embodiments of the disclosure.

While having an open end 3714 distally disposed from a handle 3715 to receive a bottom tip 3711 to lift its corresponding hanger 3704 from the track 3702 is one way of coupling the tool 3700 to a hanger 3704, other techniques will be obvious to those of ordinary skill in the art having the benefit of this disclosure. Illustrating by one simple example, turning now to FIG. 38, in another embodiment the hanger 3804 comprises one or more magnets 3801,3802, 3803. A corresponding tool 3800 can then be manufactured from a ferromagnetic material, such as stainless steel, or can comprise corresponding magnets. Accordingly, the tool 3800 can magnetically couple to the one or more magnets 3801,3802,3803 of the hanger 3804 to lift the hanger 3804 from a corresponding track.

Figure 40:
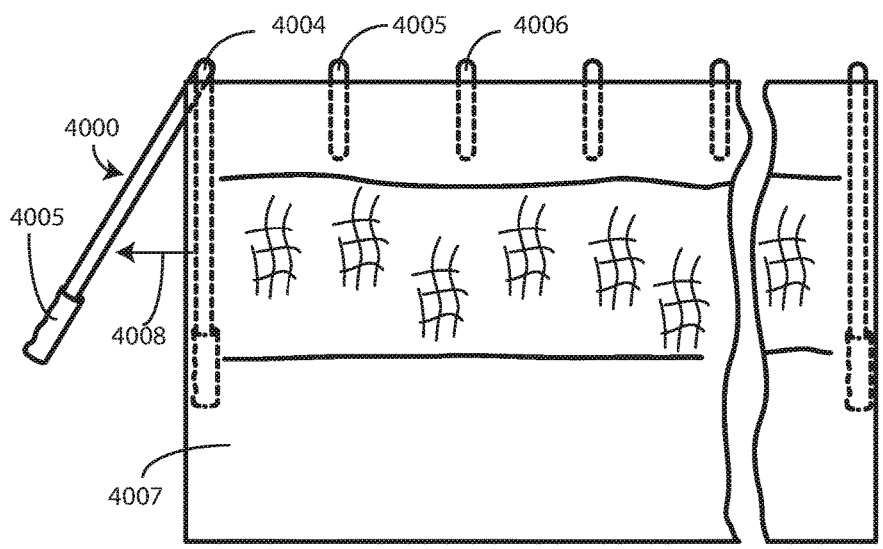
FIG. 40 illustrates one explanatory hanging system in accordance with one or more embodiments of the disclosure.

In one or more embodiments, where a tool is tethered (3716) to a hanger (3704) so as to dangle from the hanger (3704) when not in use, the tool can be used to slide the hanging item (3607) along the track (3602). Turning now to FIG. 40, illustrated therein is one such embodiment.

As shown in FIG. 40, one or more hangers 4004,4005, 4006 are hanging on a track. A hanging item 4007, which is a curtain in this illustrative embodiment, hangs from the one or more hangers 4004,4005,4006. One or more of the hangers 4004,4005,4006 has a tool 4000 attached thereto. Illustrating by example, in this embodiment hanger 4004 has the tool 4000 attached thereto. With such a configuration a user can simply pull 4008 the handle 4015 of the tool 4000 to move the hanging item 4007 along the track.

Figure 41:
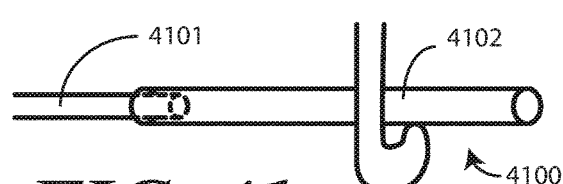
FIG. 41 illustrates one explanatory expanding track system in accordance with one or more embodiments of the disclosure.

Turning now to FIG. 41, illustrated therein is an alternate track 4100. While some tracks described above, e.g., track (900) of FIG. 9, were manufactured as a continuous piece, embodiments of the disclosure are not so limited. As shown in FIG. 41, the track 4100 can also be telescoping, with a first portion 4101 inserted into a second portion 4102 of the track 4100. In one or more embodiments, magnets can be used to hold the first portion 4101 and the second portion 4102 together. Other techniques for creating telescoping tracks will be obvious to those of ordinary skill in the art having the benefit of this disclosure.

Figure 42:
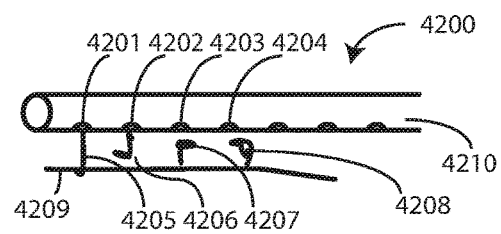
FIG. 42 illustrates an explanatory track system with alignable hooks in accordance with one or more embodiments of the disclosure.

Turning now to FIG. 42, illustrated therein is a self-aligning track and hanger system 4200. One or more aligners 4201,4202,4203,4204 can be disposed along the track 4210. At the same time, one or more alignees 4205,4206,4207, 4208 can extend from a hanging item 4209. When the hanging item 4209 approaches the track 4210, the one or more alignees 4205,4206,4207,4208 can self-align with the one or more aligners 4201,4202,4203,4204. For example, the more aligners 4201,4202,4203,4204 can comprise magnets while the one or more alignees 4205,4206,4207,4208 comprise ferromagnetic materials or complementary magnets.

Figure 43:
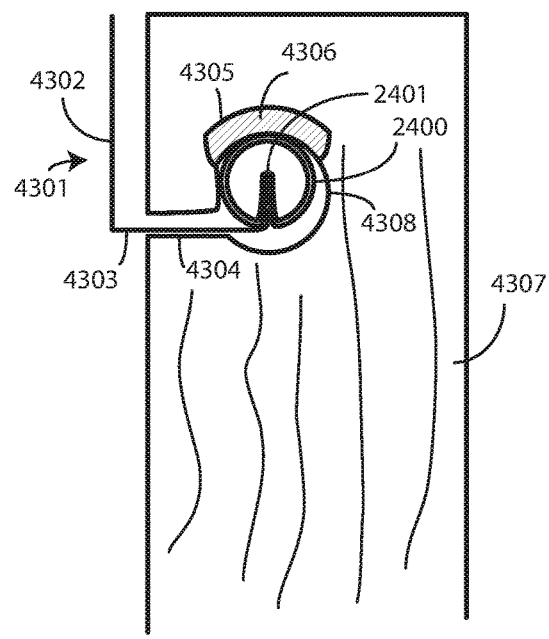
FIG. 43 illustrates one explanatory hanging system in accordance with one or more embodiments of the disclosure.

Turning now to FIG. 43, illustrated therein is the track 2400 of FIG. 24 attached to one explanatory track hanger 4301. In this illustrative embodiment, the track hanger 2501 includes an extension 4302 and a hook 4303 that terminates at a tip. The tip of the hook 4303 is inserted into the peninsular indentation 2401 of the track 2400. Here, the tip is inserted until it reaches the friction pinch 2402 where each side of the peninsular indentation 2401 comes close enough together that the tip will be frictionally retained within the track 2400.

A hanging item 4307 defines an aperture 4308 to which a reinforcing device 4305 is attached. A slit 4304 traverses a portion of the hanging item 4307. The track 2400 can pass through the slit 4304, thereby spreading the same, when the hanging item 4307 is hung on the track 2400.

In this illustrative embodiment, the reinforcing device 4305 comprises a cloth covering 4306 to reduce noise as the reinforcing device 4305 slides along the track 2400. The reinforcing device 4305 is broader than the track 2400, thereby providing a point of contact between the two that only spans a small portion of the lower surface of the reinforcing device 4305. In addition to reducing noise by reducing plastic clacking, the reinforcing device 4305 spreads the aperture 4308 of the hanging item 4307 to reduce friction as the hanging item 4307 passes along the track 2400. In one or more embodiments, the far right and left sides of the reinforcing device 4305 are set high enough above the slit 4304 so as not to interfere with the track 2400 when it passes through the slit 4304 when the hanging item 4307 is hung on the track 2400.

Figure 44:
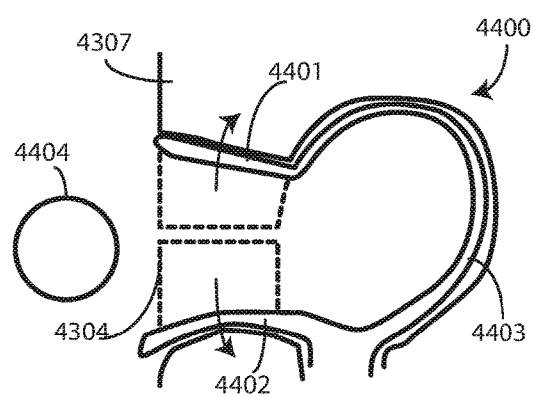
FIG. 44 illustrates a hanging item mounter in accordance with one or more embodiments of the disclosure.

In one embodiment, to make mounting the hanging item 4307 on the track easier, a tool can be used. Turning now to FIG. 44, illustrated therein is such a tool 4400.

Figure 45:
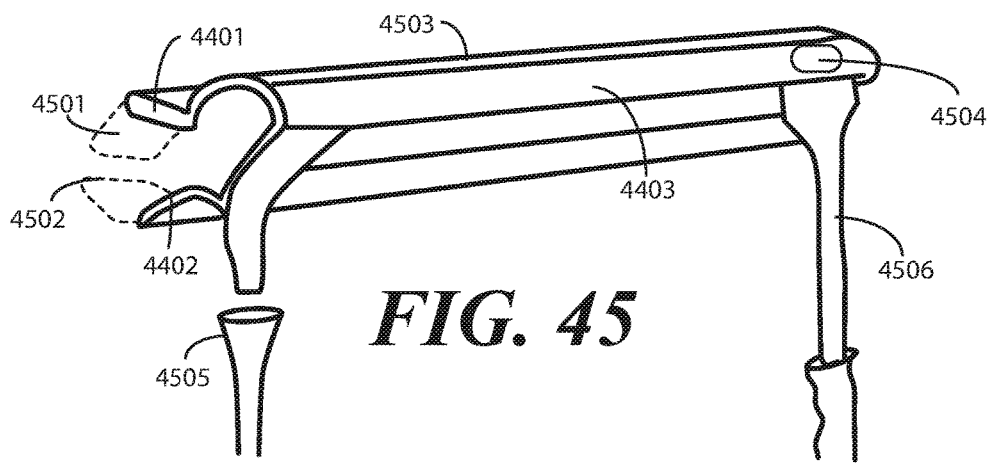
FIG. 45 illustrates another hanging item mounter in accordance with one or more embodiments of the disclosure.

The tool 4400 of FIG. 44 is a duck-billed tool having a pair of duckbills 4401,4402 extending from a cylindrical port 4403. The cylindrical port 4403 can be disposed within the aperture 4308 of the hanging item 4307. When hanging the hanging item 4307, the duckbills 4401,4402 spread the slit 4304 to kick up the terminating edges of each side of the slit 4304 to spread the same about the perimeter of a track 4404. This facilitates easy mounting of the hanging item 4307 on a track 4404, even when the hanging item 4307 fails to include a reinforcing device (4305). As shown in FIG. 45, the cylindrical port 4403 and duckbills 4401,4402 of the duck-billed tool can be extended that each and every aperture (4308) of a hanging item (4307) can sit on the same tool.

In one or more embodiments, the cylindrical port 4403 and/or duckbills 4401,4402 can be manufactured from a pliant material. For example, in one embodiment the cylindrical port 4403 and/or duckbills 4401,4402 can be manufactured from a pliant thermoplastic. In another embodiment, the cylindrical port 4403 and/or duckbills 4401,4402 can be manufactured from a springy metal so as to move around a track (4404) when the hanging item (4307) is being installed. Optional extension ramps 4501,4502 can extend from the duckbills 4401,4402 to help insert the duckbills 4401,4402 into the slit (4304) of a hanging item (4307) such as a curtain. An optional twist/anti-twist groove 4503 can be incorporated into the cylindrical port 4403 to prevent the apertures (4308) of a hanging item (4307) from twisting along the cylindrical port 4403 during the hanging process. Where reinforcing devices (4305) include magnets, complementary magnets 4504 can be included in the tool to hold down the hanging device (4307) while it is being removed. Handles 4505,4506 used to manipulate the tool may be permanently affixed, e.g., handle 4506, or detachable from the tool, e.g., handle 4505.

There are many was to use the tool of FIG. 45. In one embodiment, a user would slide a hanging item, like a curtain, along a track to the right or left. The user could then place the tool along the track where there was no hanging item present. The user could then slide the hanging item along the cylindrical port 4403, folding the hanging item along the way, until the hanging item was completely disposed along the cylindrical port 4403. The user could then simply remove the tool from the track to dismount the hanging item in a single motion.

Figure 46:
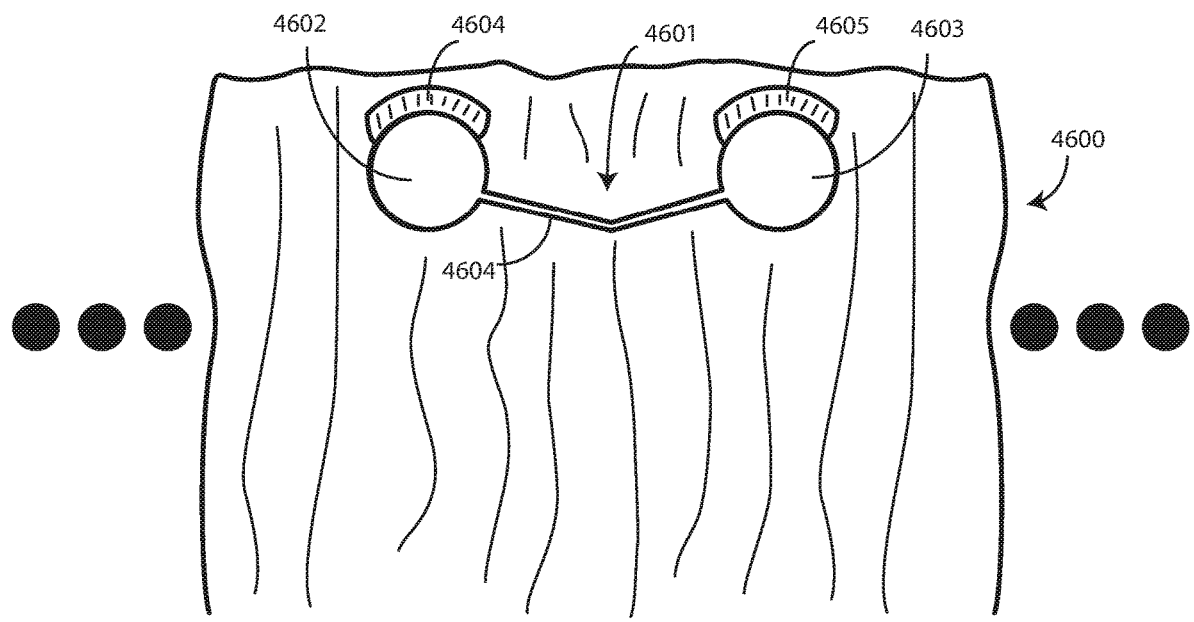
FIG. 46 illustrates another hanging item in accordance with one or more embodiments of the disclosure.

Turning now to FIG. 46, illustrated therein is an alternate hanging item 4600 in accordance with one or more embodiments of the disclosure. Only a portion of the hanging item 4600 is shown in FIG. 46 for convenience. The section could be repeated to the right and left of the illustrated section, as indicated by the ellipsis.

The hanging item 4600 of FIG. 46 includes an integrated hanger 4601 that comprises oppositely facing, separated apertures 4602,4603 connected by a bent extension bridge slit 4604. In one embodiment, the oppositely facing, separated apertures 4602,4603 connected by the bent extension bridge slit 4604 can be cut, sewn, or otherwise integrated into the hanging item 4600.

In this illustrative embodiment, each oppositely facing, separated apertures 4602,4603 connected by the bent extension bridge slit 4604 is bounded above by a reinforcing device 4605,4606. In the illustrative embodiment of FIG. 46, the reinforcing devices 4605,4606 are disposed above at least a portion of each oppositely facing, separated aperture 4602,4603. In one embodiment, each reinforcing device 4605,4606 is rigid and comprises a plastic device that is stitched, adhesively attached, or otherwise bonded to the hanging item 4600.

Rather than folding a hanger attached to the hanging item 4600, to use the hanging item 4600 of FIG. 46, one folds the bent extension bridge slit 4604, thereby causing the portion of each oppositely facing, separated aperture 4602,4603 connected to the bent extension bridge slit 4604 to face in the same direction. The hanging item 4600 can then be quickly and easily mounted on a track by placing the track receiver about a track such that the track seats within lobes defined by the oppositely facing, separated apertures 4602, 4603. The hanging assembly 4700 is shown in FIG. 47.

Figure 47:
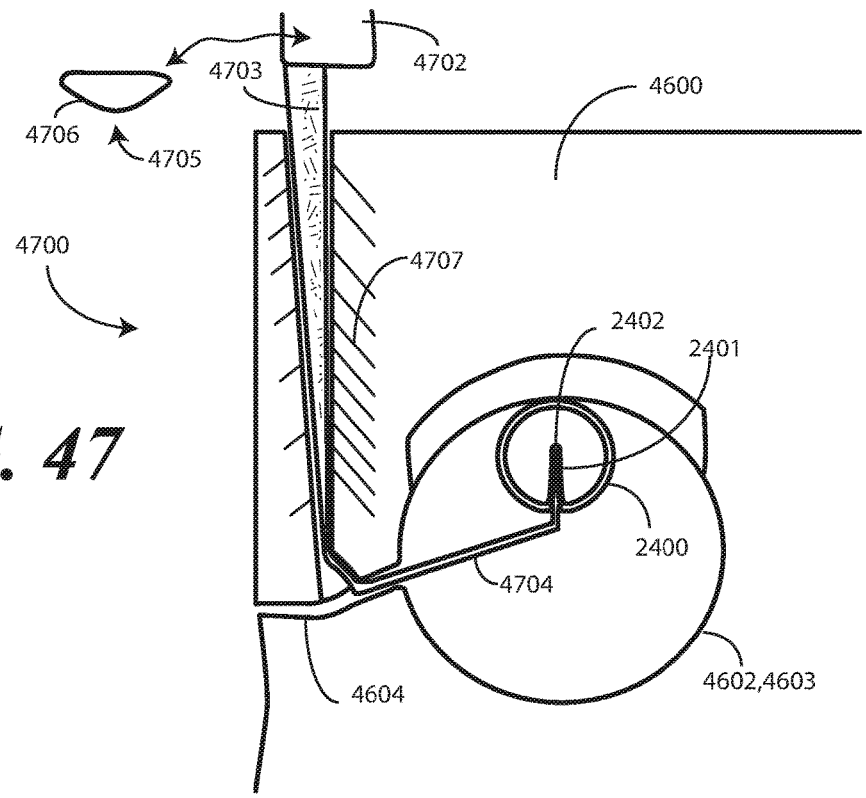
FIG. 47 illustrates one explanatory hanging system in accordance with one or more embodiments of the disclosure.

Turning now to FIG. 47, note that the hanging assembly 4700 is hanging from a track 2400 supported by one or more track hangers 4701. As shown in FIG. 47, the track hanger 4701 includes a base 4702, an extension 4703, and a hook 4704. The tip of the hook 4704 opposite the base 4702 is inserted into the peninsular indentation 2401 of the track

2400. Here, the tip is inserted until it reaches the friction pinch 2402 where each side of the peninsular indentation 2401 comes close enough together that the tip will be frictionally retained within the track 2400.

In this embodiment, the extension 4703 is rounded on the side facing the oppositely facing, separated apertures 4602, 4603 connected by the bent extension bridge slit 4604 is rounded. This is shown in the top view 4705 of the extension 4703. The very rounded bevel 4706 on the front of the extension 4703 allows for an easy glide when the hanging item 4600 is moved along the track 2400. In one or more embodiments, an optional abrasion resistive material 4707 can be applied to the hanging item 4600 to make the glide even smoother.

Figure 48:
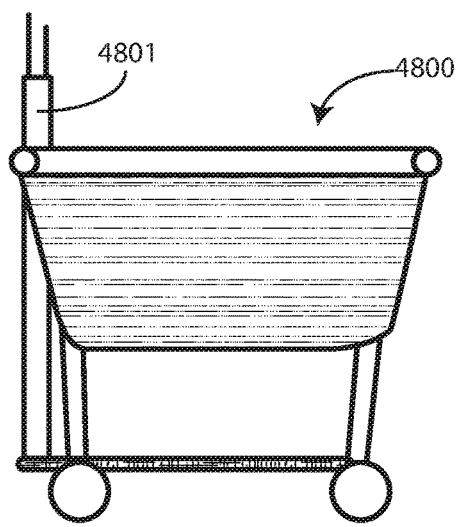
FIG. 48 illustrates one explanatory hanging item catcher in accordance with one or more embodiments of the disclosure.
Figure 49:
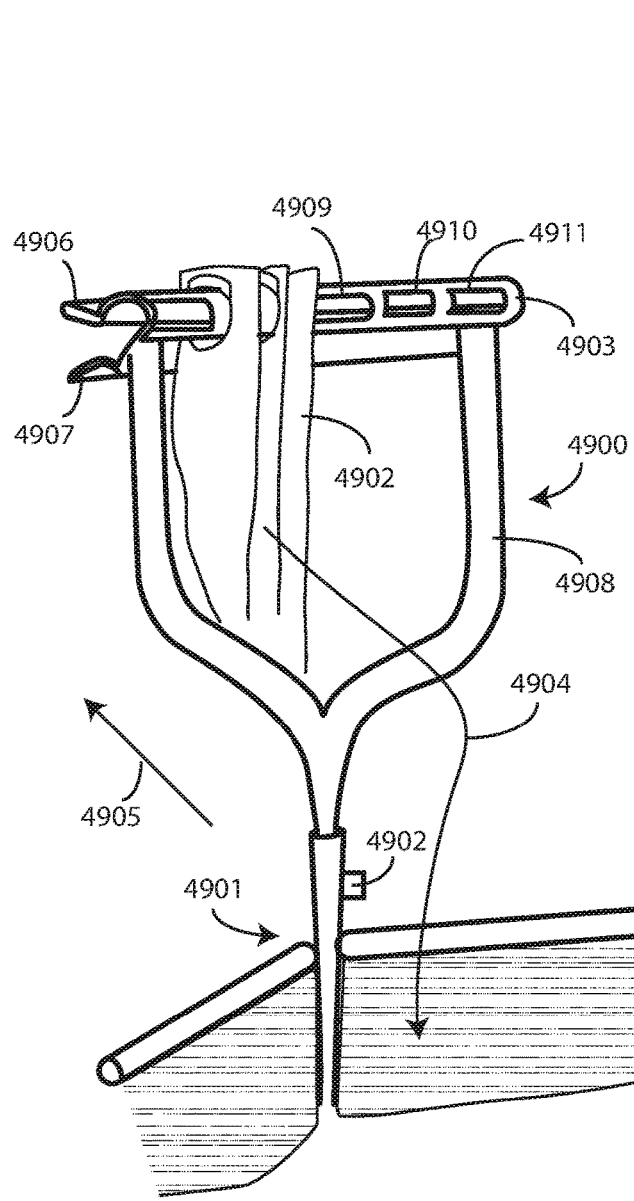
FIG. 49 illustrates one explanatory hanging item catcher system in accordance with one or more embodiments of the disclosure.

Recall from the discussion of FIGS. 37, 38, 44, and 45 above that in one or more embodiments a tool can be used to remove a hanging item from a track. Not only does a tool make mounting and dismounting the hanging item easier, but it offers other benefits as well. Turning now to FIGS. 48-49, illustrated therein is one of these advantages.

As shown in FIGS. 48-49, in one or more embodiments a tool 4900 can be attached to a laundry basket 4800. In one embodiment, the tool 4900 is permanently mounted to a corner 4901 of the laundry basket 4800, which is configured as a wheeled cart in this illustrative embodiment. In other embodiments, prior art carts can be retrofitted so that the tool 4900 can be attached.

The tool 4900 can be mounted on a telescoping post 4801 in one or more embodiments. In one embodiment, a quick locking mechanism 4902 can be included to lock the tool 4900 at a predetermined height. In other embodiments, the telescoping post 4801 can include a twist lock. Other types of locking mechanisms will be obvious to those of ordinary skill in the art having the benefit of this disclosure. For example, the locking mechanism could be powered by a foot-pedal. Additionally, a shock absorber may be included at the base of the tool 4900 to soften retraction actions.

In one or more embodiments, the cylindrical port 4903 includes one or more apertures 4904,4910,4911. These apertures 4904,4910,4911 are optional. In one embodiment, the apertures 4904,4910,4911 are added to reduce the overall weight of the tool 4900. The apertures 4904,4910,4911 can also be used to lower the center of gravity of the tool 4900.

In one embodiment, the tool 4900 includes a Y-shaped double handle 4908. In one embodiment, the Y-shaped double handle 4908 serves as a reacher to dismount a hanging item 4902. While the Y-shaped double handle 4908 is disposed at a corner of the laundry basket 4800 in this illustrative embodiment, the Y-shaped double handle 4908 could be disposed in other locations as well. For example, in another embodiment the Y-shaped double handle 4908 could be disposed in the center of the laundry basket 4800. Other locations will be obvious to those of ordinary skill in the art having the benefit of this disclosure.

Using the technique described above with reference to FIG. 45, a user could position the hanging item 4902 along the cylindrical port 4903 of the tool 4900 to remove the hanging item 4902 from the track. Specifically, a user could slide the hanging item 4902 along a track to the right or left. The user could then place the tool 4900 along the track where there was no hanging item 4902 present. The user could then slide the hanging item 4902 along the cylindrical port 4903, folding the hanging item along the way, until the hanging item was completely disposed along the cylindrical port 4903. The user could then simply remove the tool 4900 from the track to dismount the hanging item 4902 in a single motion. In one or more embodiments, the user could stand on a side 4905 to which the duckbills 4906,4907 of the tool 4900 were directed so that they could easily see the track. The hanging item 4902 could then quickly and effortlessly be placed 4904 into the laundry basket 4800 for laundering.

Figure 50:
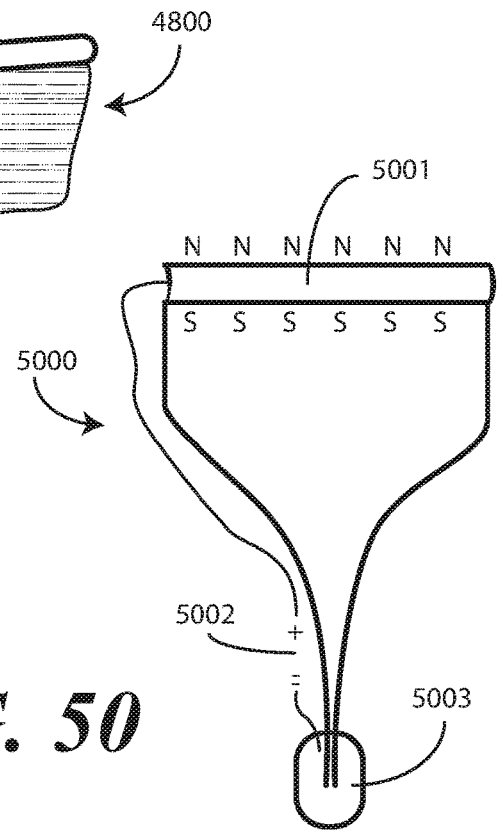
FIG. 50 illustrates one explanatory magnetized hanging item mounter in accordance with one or more embodiments of the disclosure.

Recall from above that in one or more embodiments one or both of the track, e.g., track (3602) or the hangers, e.g., hangers (3604,3605,3606) can include magnets. Turning now to FIG. 50, illustrated therein is a tool 5000 that can be useful in mounting such tracks or hangers. The tool 5000 of FIG. 50 includes an electromagnet 5001 that is controlled by a switch 5002 disposed near the handle 5003. When a user actuates the switch 5002, the electromagnet 5001 is energized, thereby creating a magnetic field. A user can use the tool 5000 to turn on the electromagnet 5001 to hold on to, and align, tracks or track hangers or hangers that include either magnets or ferromagnetic materials.

Figure 51:
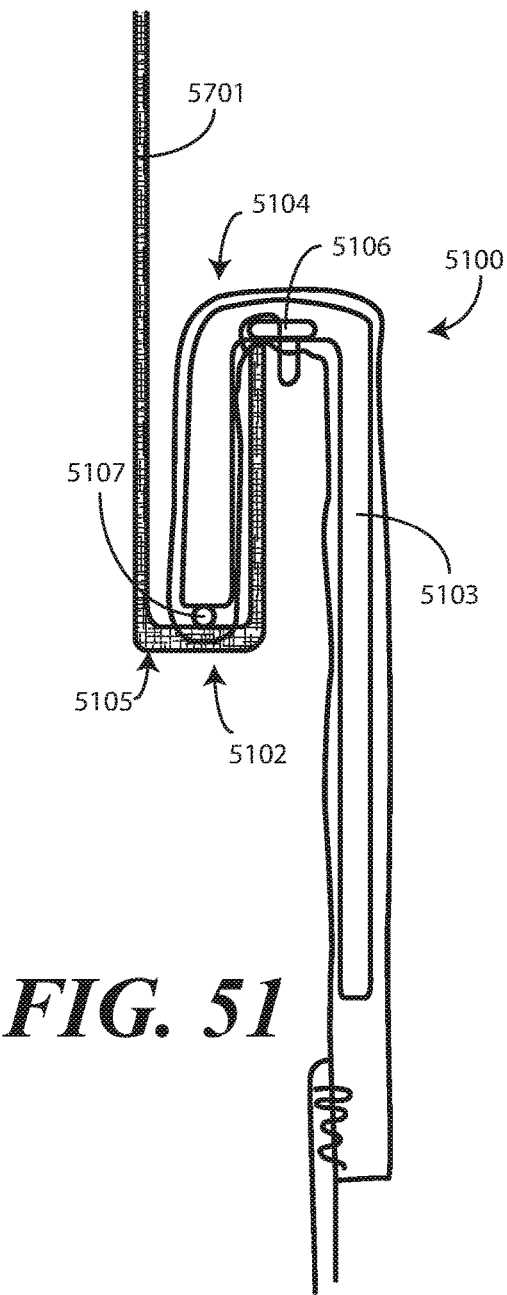
FIG. 51 illustrates one explanatory hanging system in accordance with one or more embodiments of the disclosure.

Turning now to FIG. 51, illustrated therein is an alternate hanging system 5100 configured in accordance with one or more embodiments of the disclosure. In FIG. 51, a hanger device 5101 defines a track 5102 into which a hanger 5103 can be positioned. Here, the hanger device 5101 defines a generally U-shaped track 5102. Where the hanger 5103 defines a complementary, inverted U-shape, it is possible for there to be wear points at two locations 5104,5105 where the hanger 5103 engages the U-shaped track 5102. In one or more embodiments, friction-reducing elements 5106,5107 can be added at these locations 5104,5105 to reduce wear. Examples of friction-reducing elements 5106,5107 include Kevlar bearings, ball bearings, slippery plastic pieces, and so forth. Other examples of friction-reducing elements 5106, 5107 will be obvious to those of ordinary skill in the art having the benefit of this disclosure.

Figure 52:
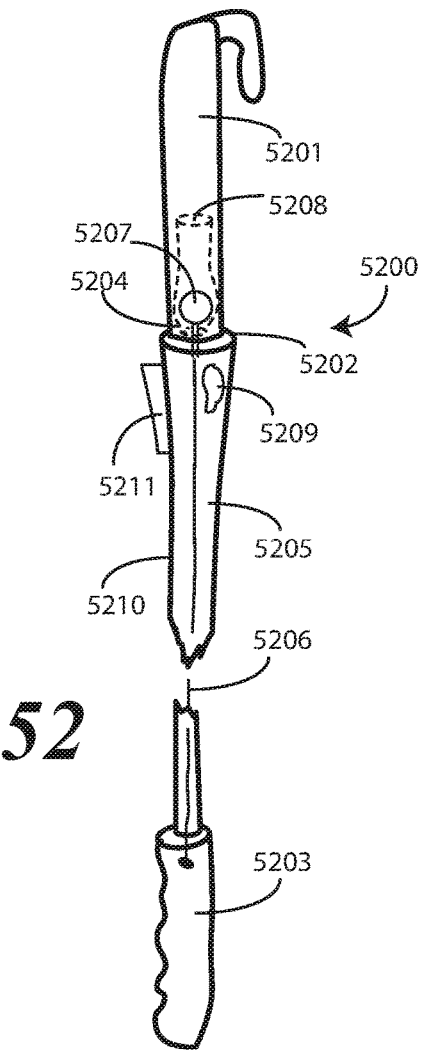
FIG. 52 illustrates one explanatory hanging item mounter in accordance with one or more embodiments of the disclosure.

Turning now to FIG. 52, a tool 5200, configured as a baton in this embodiment, is provided for both lifting hangers 5201 from a track and for moving hangers 5201 laterally along a track. In one embodiment, the tool 5200 includes having an open end 5202 distally disposed from a handle 5203 to receive a bottom tip 5204 of a hanger 5201. A user can grasp the handle 5203 to lift the open end 5202 up to engage the bottom tip 5204 of the hanger 5201 to lift it from the track.

In one or more embodiments, the tool 5200 can be tethered 5205 to the hanger 5201 by a cord, wire, or cable 5206. In one embodiment, the cord, wire, or cable 5206 is longer than the tool 5200 so as to dangle from the hanger 5201 when not in use as a lifter or reacher. When dangling, the tool 5200 can be used as a baton in that a user can grasp the handle 5203 to move the hanger 5201, and any hanging item attached thereto, left or right laterally along a track. Where the tool 5200 is tethered 5205 to the hanger 5201, in one or more embodiments it is detachable from the hanger 5201 so that the hanging item to which the hanger 5201 is attached can be washed. In this embodiment, the latching ball 5207 can be removed from the interior cavity 5208 of the hanger 5201 to detach the tool 5200 from the hanger 5201.

In one or more embodiments, the tool 5200 includes a coating 5209. For example, the coating 5209 can comprise one or more antimicrobial layers, treatments, or additives to enhance antimicrobial protection. Further, the coating 5209 can comprise charcoal or other odor absorbing materials can be integrated into the materials above to absorb odors. In other embodiments, the coating 5209 comprises an antibacterial, antimicrobial, or anti-odor material integrated therein to help reduce the risk of the tool 5200 serving as a vector for bacteria, microbes, or odors.

In other embodiments, the tool 5200 can be manufactured from multiple parts. For example, the shaft 5210 of the tool 5200 may be detachable and disposable so that it can be replaced anytime necessary. In another embodiment, rather than having a coating 5209, the shaft 5210 has a cover 5211 that is disposable help reduce the risk of the tool 5200 serving as a vector for bacteria, microbes, or odors.

Figure 53:
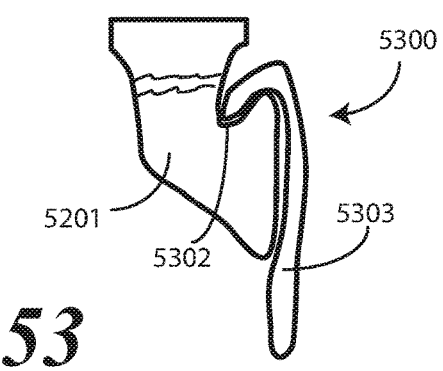
FIG. 53 illustrates one explanatory hanging system in accordance with one or more embodiments of the disclosure.

Turning now to FIG. 53, illustrated therein is a different type hanging system 5300 configured in accordance with one or more embodiments of the disclosure. In FIG. 53, a hanger device 5301 is shaped like the bell of a Sousaphone and defines a track 5302 into which a hanger 5303 can be positioned. Here, the hanger device 5301 defines track 5302 that is deep enough for the hanger to not jump off when not in use.

Figure 54:
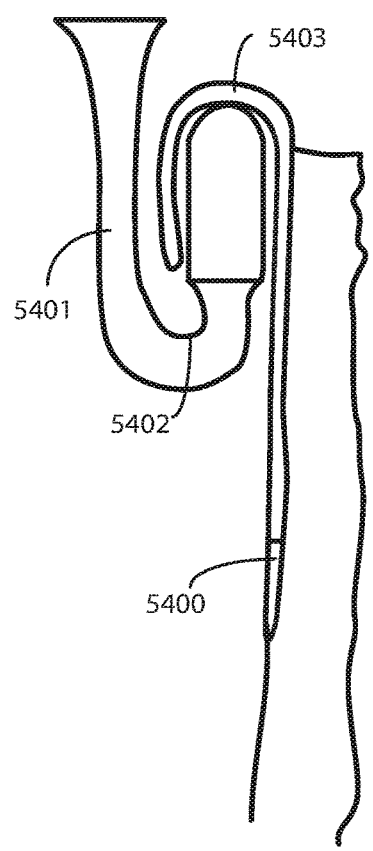
FIG. 54 illustrates one explanatory hanging system in accordance with one or more embodiments of the disclosure.
Figure 56:
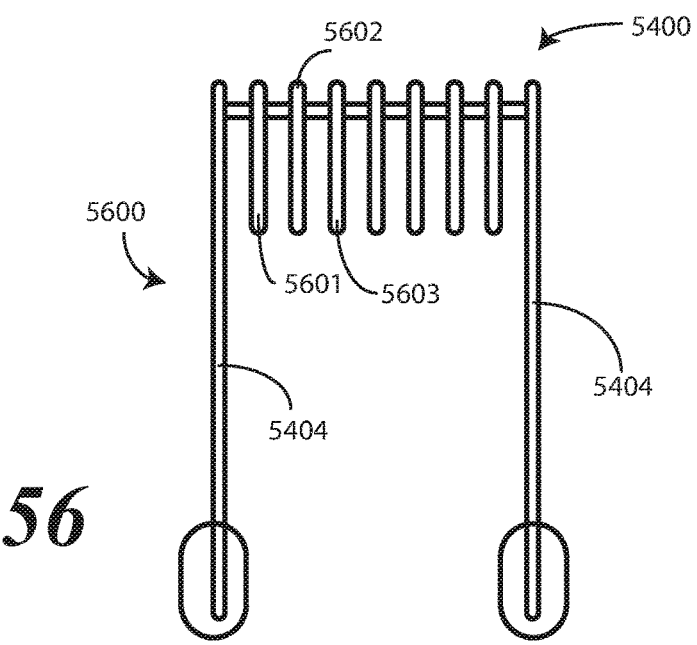
FIG. 56 illustrates one explanatory hanging system in accordance with one or more embodiments of the disclosure.

Turning now to FIG. 54, therein is an alternate hanging system 5400 configured in accordance with one or more embodiments of the disclosure. In FIG. 54, a hanger device 5401 defines a track 5402 into which a hanger 5403 can be positioned. Here, the hanger device 5401 defines a generally U-shaped track 5402. Here, the hanger 5403 disposed at each end includes an antimicrobial baton/reacher combination tool 5404. In one embodiment, not every hanger in the system 5400 includes an antimicrobial baton/reacher combination tool 5404. In one embodiment, as shown in the side view 5600 of FIG. 56, the antimicrobial baton/reacher combination tool 5404 is positioned only at each end of the system 5400, while other hangers 5601,5602,5603 do not include a corresponding antimicrobial baton/reacher combination tool 5404.

Figure 55:
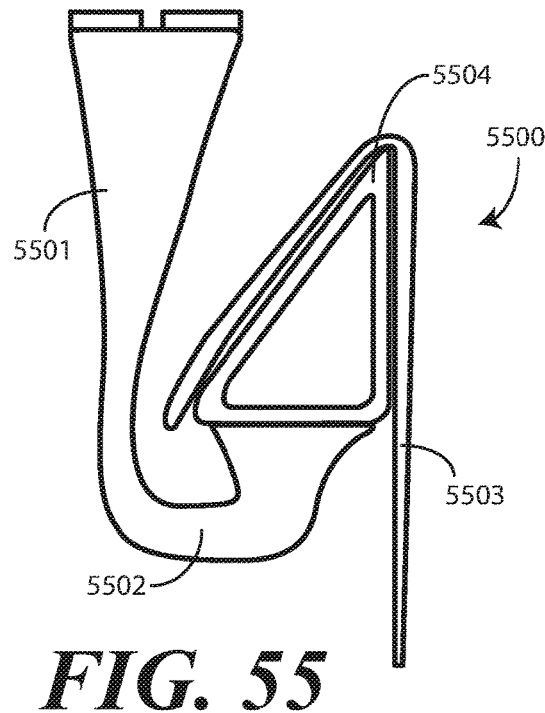
FIG. 55 illustrates one explanatory hanging system in accordance with one or more embodiments of the disclosure.

Turning now to FIG. 55, illustrated therein is a different type hanging system 5500 configured in accordance with one or more embodiments of the disclosure. In FIG. 55, a hanger device 5501 defines a track 5502 into which a hanger 5503 can be positioned. Here, the tip of the hanger device 5501 defines a triangular cross section 5504. The hanger 5503 is correspondingly shaped.

Figure 57:
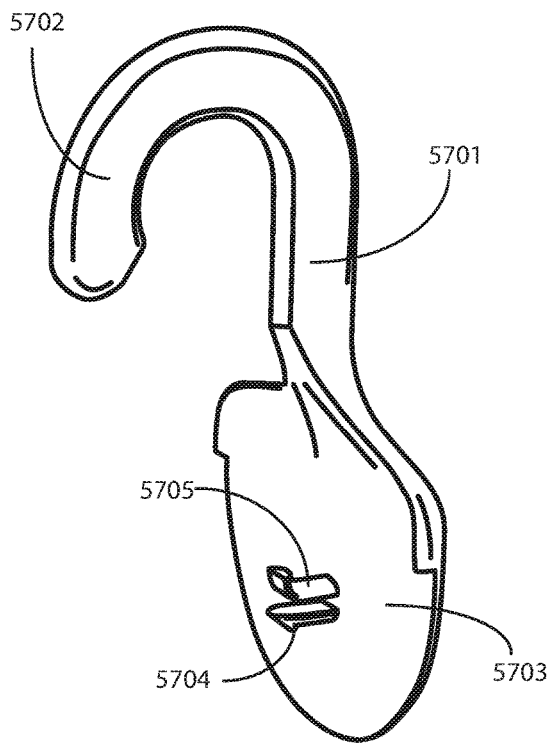
FIG. 57 illustrates one explanatory hanging item in accordance with one or more embodiments of the disclosure.
Figure 58:
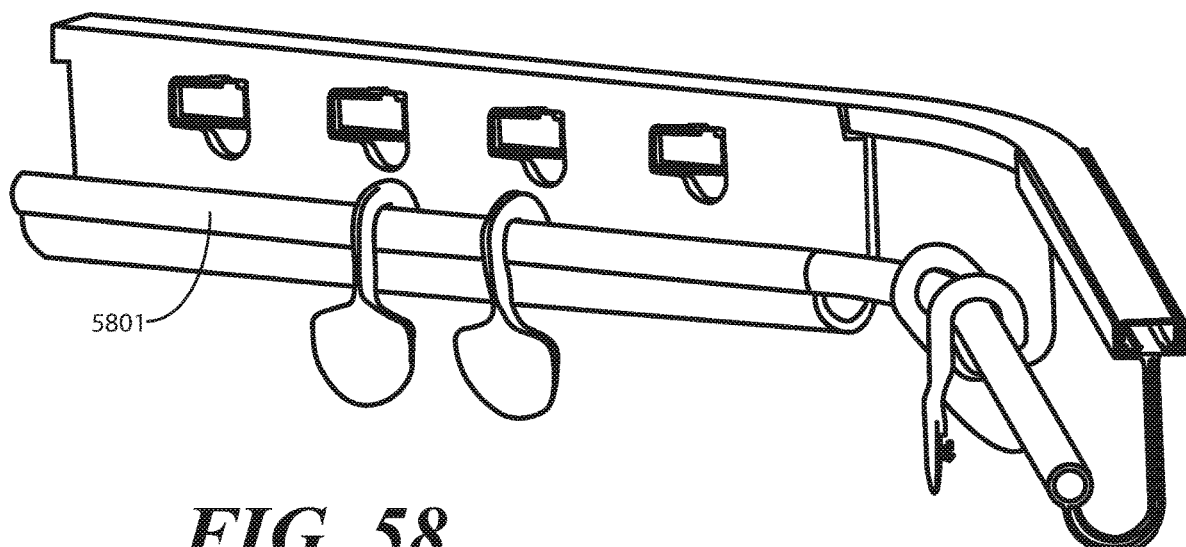
FIG. 58 illustrates one explanatory hanging system in accordance with one or more embodiments of the disclosure.

Turning now to FIG. 57, illustrated therein is another hanger 5701 suitable for positioning on a track. The hanger 5701 includes a hook 5702 for attachment to a track and a paddle 5703 for attachment to a hanging item, such as a curtain. The paddle 5703 includes two attachment devices 5704,5705 for attachment to a curtain or other object. The hanger 5701 is shown positioned on a track 5801 in FIG. 58.

Embodiments of the disclosure provide numerous advantages over prior art designs that include metal or plastic rings. These advantages include quieter movement due to the use of mesh hangers and plastic tracks in some embodiments. Additionally, the mesh hangers provide increased durability when subjected to machine-washing processes. Further, mesh hangers do not break as do rigid plastic rings. Another advantage offered by embodiments of the disclosure is the reduced labor cost associated with mounting and dismounting hanging items. Embodiments of the disclosure are lighter in weight, which results in easier assembly, lower manufacturing costs, and lowered shipping cost. Further, when the track is configured to be bendable, fewer components are required to create complex track designs.

In the foregoing specification, specific embodiments of the present disclosure have been described. However, one of ordinary skill in the art appreciates that various modifications and changes can be made without departing from the scope of the present disclosure as set forth in the claims below. Thus, while preferred embodiments of the disclosure have been illustrated and described, it is clear that the disclosure is not so limited. Numerous modifications, changes, variations, substitutions, and equivalents will occur to those skilled in the art without departing from the spirit and scope of the present disclosure as defined by the following claims. Accordingly, the specification and figures are to be regarded in an illustrative rather than a restrictive sense, and all such modifications are intended to be included within the scope of present disclosure. The benefits, advantages, solutions to problems, and any element(s) that may cause any benefit, advantage, or solution to occur or become more pronounced are not to be construed as a critical, required, or essential features or elements of any or all the claims.

What is claimed is:

1. An apparatus, comprising:
    an item having a hanger with an upper edge, the hanger defining oppositely facing, separated C-shaped open apertures, separated by an extension bridge; wherein, the open apertures are defined by an opening in the upper edge that extends down to the oppositely facing, separated C-shaped open apertures and the extension bridge;
    the hanger to fold along a fold line disposed along the extension bridge to cause the oppositely facing, separated C-shaped open apertures to face in a common direction.

2. The apparatus of claim 1, further comprising a rigid reinforcing device disposed about at least a portion of each oppositely facing, separated C-shaped open aperture.

3. The apparatus of claim 2, the item comprising a curtain extending distally the hanger.

4. The apparatus of claim 3, the curtain comprising a porous mesh section and an opaque section, the porous mesh section disposed between the hanger and the opaque section.

5. The apparatus of claim 4, the porous mesh section extending between eighteen and twenty-two inches beneath the hanger.

6. The apparatus of claim 1, the oppositely facing, C-shaped open apertures comprising a first C-shaped open aperture and a second C-shaped open aperture, the hanger defining an opening situated to a right side of the first C-shaped open aperture and a left side of the second C-shaped open aperture.

7. The apparatus of claim 6, the extension bridge separating the first C-shape open aperture from the second C-shaped open aperture by a distance of between two and twenty inches.

8. The apparatus of claim 7, the extension bridge separating the first C-shape open aperture from the second C-shaped open aperture by between five and ten inches.

9. The apparatus of claim 7, the extension bridge separating the first C-shaped open aperture from the second C-shaped open aperture by between ten and fifteen inches.

10. The apparatus of claim 7, the extension bridge separating the first C-shape open aperture from the second C-shaped open aperture by about twelve and a half inches.

11. The apparatus of claim 2, the rigid reinforcing device comprising a plastic device that is stitched to the hanger.

12. The apparatus of claim 2, the rigid reinforcing device comprising a plastic device that is adhesively bonded to the hanger.

13. The apparatus of claim 3, further comprising a track seated within lobes defined by each of the oppositely facing, C-shaped open apertures.

14. The apparatus of claim 13, further comprising a bracket coupled to the track.

15. The apparatus of claim 13, the track comprising a tube and a peninsular indentation.

16. The apparatus of claim 15, the peninsular indentation extending from the tube and terminating at a friction pinch configured to frictionally retain objects inserted into the peninsular indentation to the track.

17. The apparatus of claim 16, wherein the track is flexible.

18. The apparatus of claim 17, the track comprising a coating.

19. The apparatus of claim 18, the coating comprising a silicon-based coating.

* * * * *